US012216769B2

(12) United States Patent
Ponsini et al.

(10) Patent No.: US 12,216,769 B2
(45) Date of Patent: Feb. 4, 2025

(54) SECURE ELEMENT ENFORCING A SECURITY POLICY FOR DEVICE PERIPHERALS

(71) Applicant: Oracle International Corporation, Redwood Shores, CA (US)

(72) Inventors: Nicholas Michel Raphaël Ponsini, Mougins (FR); Patrick Van Haver, La Cadiere d+3 Azur (FR)

(73) Assignee: Oracle International Corporation, Redwood Shores, CA (US)

( * ) Notice: Subject to any disclaimer, the term of this patent is extended or adjusted under 35 U.S.C. 154(b) by 354 days.

(21) Appl. No.: 17/733,562

(22) Filed: Apr. 29, 2022

(65) Prior Publication Data

US 2023/0351028 A1 Nov. 2, 2023

(51) Int. Cl.
*G06F 21/60* (2013.01)
*G06F 21/85* (2013.01)
*H04L 9/40* (2022.01)

(52) U.S. Cl.
CPC .............. *G06F 21/60* (2013.01); *G06F 21/85* (2013.01); *H04L 63/20* (2013.01)

(58) Field of Classification Search
None
See application file for complete search history.

(56) References Cited

U.S. PATENT DOCUMENTS

| 6,112,987 | A | 9/2000 | Lambert et al. |
| 10,063,375 | B2 * | 8/2018 | Thom .................. H04L 9/3234 |
| 10,084,604 | B2 | 9/2018 | Burghardt et al. |
| 2006/0085848 | A1 | 4/2006 | Aissi et al. |
| 2007/0207798 | A1 | 9/2007 | Talozi et al. |
| 2008/0147508 | A1 | 6/2008 | Liu et al. |
| 2008/0230609 | A1 | 9/2008 | Singh et al. |
| 2012/0108206 | A1 | 5/2012 | Haggerty |

(Continued)

FOREIGN PATENT DOCUMENTS

| EP | 1566941 A1 | 8/2005 |
| GB | 2328042 A | 2/1999 |

(Continued)

OTHER PUBLICATIONS

Samsung R&D Institute UK, "DRAFT Reply LS from ETSI TC SCP about the multiple logical interfaces support", ETSI DRAFT; SCP(21)000112, European Telecommunications Standards Institute, Jul. 8, 2021.

(Continued)

*Primary Examiner* — Fatoumata Traore
(74) *Attorney, Agent, or Firm* — Invoke

(57) ABSTRACT

Techniques for implementing and enforcing a security policy in a secure element are disclosed. The secure element enforces the security policy to grant and/or deny access, such as from an application processor, to configuration of the device peripheral components and access to data of the device peripheral components across one or more bus architectures, such as an I3C bus. Implementing an access control policy in a secure element allows execution of code within the isolated secure element hardware processor, preventing software attacks that may emanate from code running in the application processor. This design also benefits from hardware protections against physical attacks.

31 Claims, 17 Drawing Sheets

(56) References Cited

U.S. PATENT DOCUMENTS

| | | |
|---|---|---|
| 2012/0190354 A1 | 7/2012 | Merrien et al. |
| 2014/0123209 A1* | 5/2014 | Rajakarunanayake ............... H04W 12/37 726/1 |
| 2014/0188713 A1 | 7/2014 | Alimi |
| 2014/0245272 A1 | 8/2014 | Wilkinson et al. |
| 2015/0127529 A1 | 5/2015 | Makhotin et al. |
| 2015/0134958 A1 | 5/2015 | Merrien et al. |
| 2015/0288686 A1 | 10/2015 | Pepin et al. |
| 2016/0088464 A1 | 3/2016 | Hans |
| 2016/0173493 A1 | 6/2016 | Wane |
| 2018/0026963 A1* | 1/2018 | Ning ................... H04W 12/06 713/159 |
| 2018/0144137 A1 | 5/2018 | Rhelimi et al. |
| 2022/0124481 A1 | 4/2022 | Kang et al. |
| 2022/0159448 A1 | 5/2022 | Kang et al. |
| 2023/0217356 A1 | 7/2023 | Cogan et al. |

FOREIGN PATENT DOCUMENTS

| | | |
|---|---|---|
| WO | 2010/089401 A2 | 8/2010 |
| WO | 2015/179198 A1 | 11/2015 |
| WO | 2016/030893 A2 | 3/2016 |
| WO | 2016/108096 A1 | 7/2016 |
| WO | 2018/162117 A1 | 9/2018 |

OTHER PUBLICATIONS

"Baseline Security Recommendations for IoT", Retrieved at https://www.enisa.europa.eu/publications/baseline-security-recommendations-for-iot, Nov. 20, 2017, 3 Pages.

"MIPI I3C and I3C Basic", Retrieved at https://www.mipi.org/specifications/i3c-sensor-specification, Retrieved on May 2022, 8 Pages.

"NIST Releases Draft Guidance on Internet of Things Device Cybersecurity", Retrieved at https://www.nist.gov/news-events/news/2020/12/nist-releases-draft-guidance-internet-things-device-cybersecurity, Retrieved on May 2022, 3 Pages.

* cited by examiner

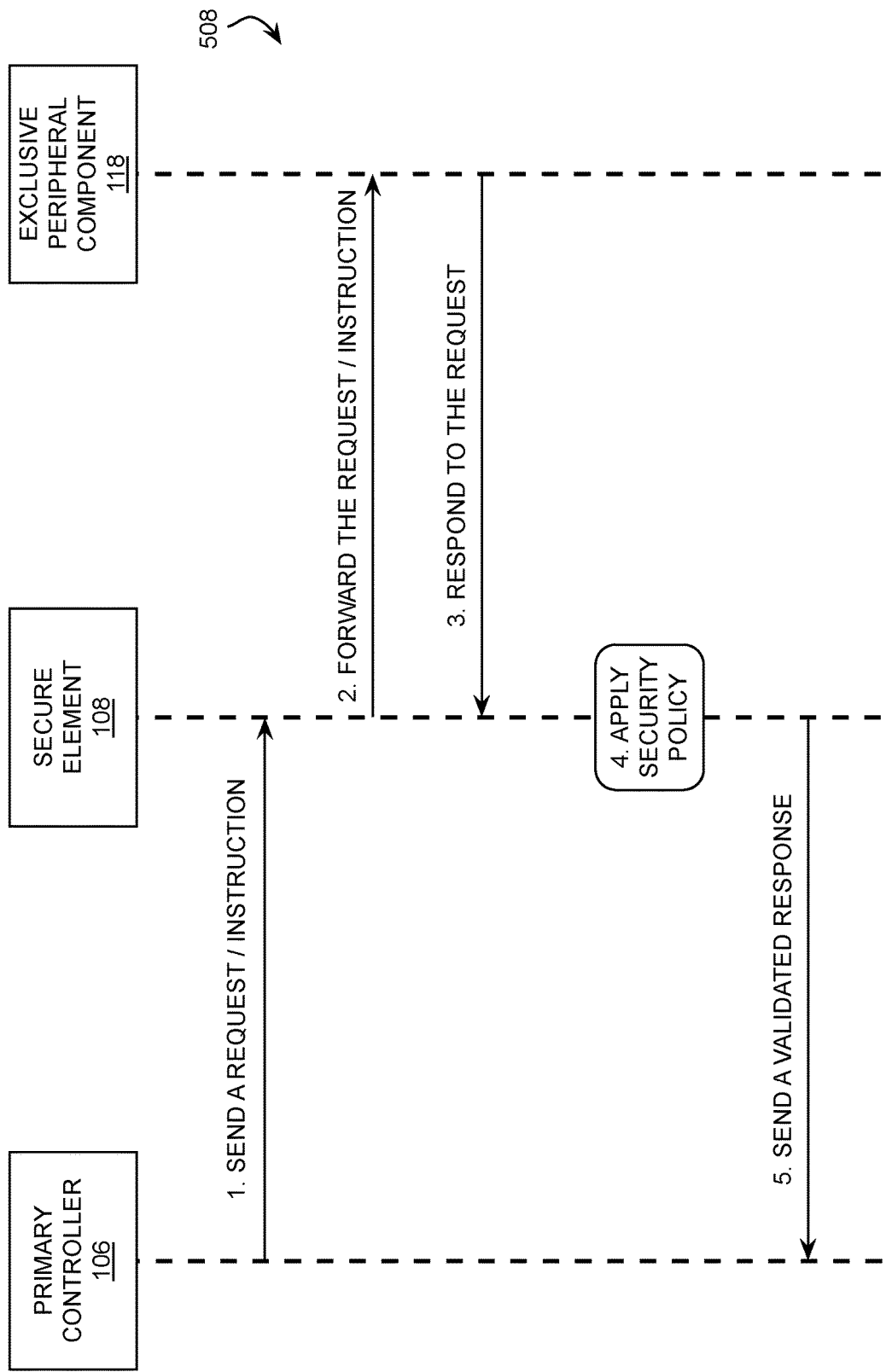

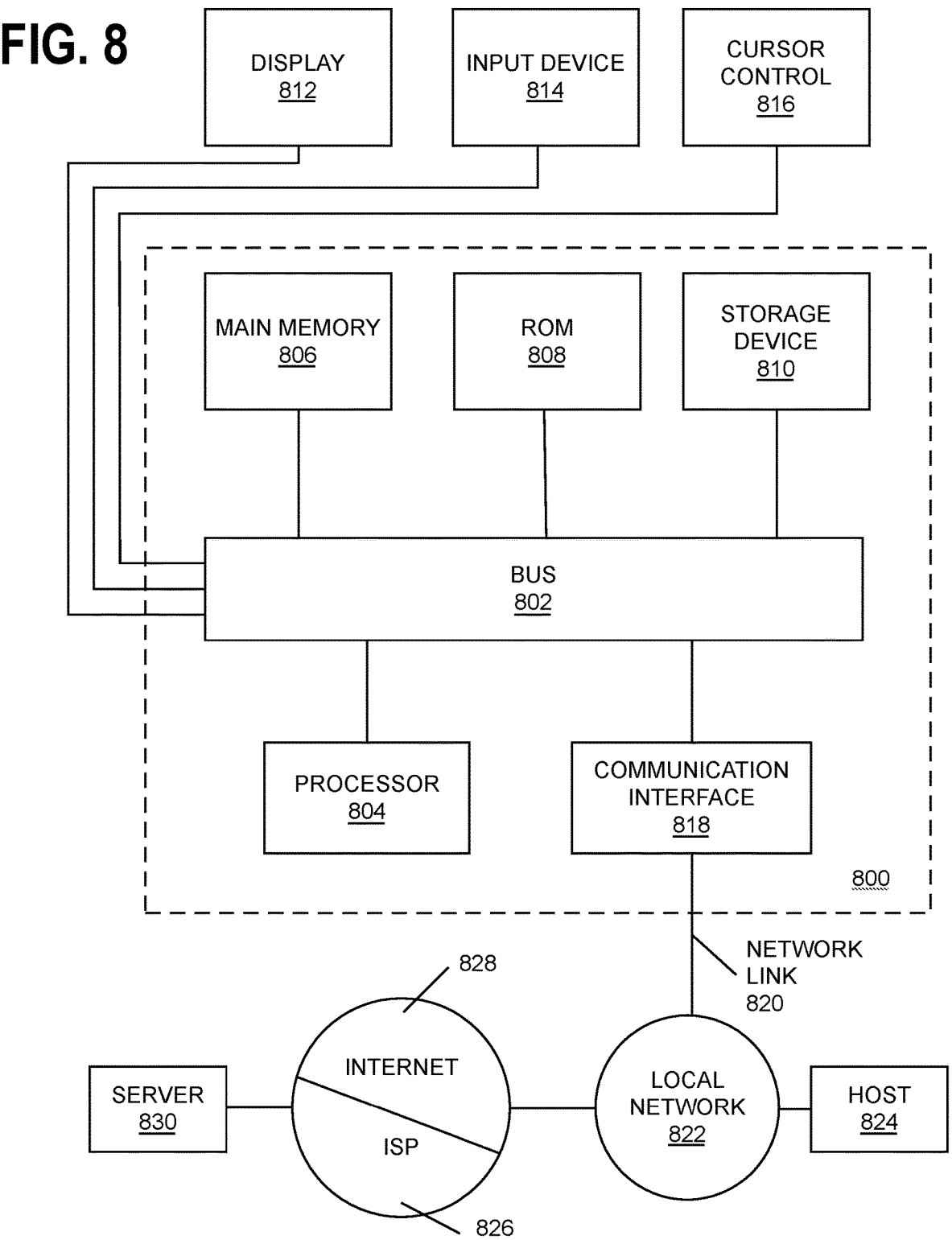

SECURE ELEMENT ENFORCING A SECURITY POLICY FOR DEVICE PERIPHERALS

TECHNICAL FIELD

The present disclosure relates to managing and controlling device peripherals. In particular, the present disclosure relates to enforcing a security policy with a secure element for messages sent and received from device peripherals.

BACKGROUND

Mass deployed devices directly or indirectly connected to the internet make great targets for attack by unauthorized persons attempting to gain unauthorized access. These attempts may also attempt to gain control of all or part of a peripheral device, hack and gain access to device data, spy and/or leak sensitive data about privacy or health, perform distributed denial of service (DDoS) attacks (e.g., botnet attacks), etc. Many instances of such attacks have been reported recently, and these attempts are increasing in frequency.

In a computing device, the device peripherals are connected through various I/O interfaces and are controlled by software running in an application processor. The application processor may be subjected to software and hardware attacks to by-pass the device Operating System (OS) access control policy. For example, malicious software exploiting a flaw may take control over a camera, a microphone, a global positioning satellite (GPS) sensor, and use the device even when the malicious software is not supposed to be able to access it.

Similarly, reading biometric data from a biometric sensor (eye scan, fingerprint reader, facial recognition, etc.) may be tampered with or completely fooled into re-using previously captured data (e.g., a man-in-the-middle replay attack). Most computing devices lack the ability to enforce strong, end-to-end security between the sensor collecting data and the code running in the application processor, or any external device utilizing the sensor data via the application processor.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 5A-5J illustrate sequence diagrams for communicating with various arrangements of peripheral components in accordance with one or more embodiments;

FIG. 8 shows a block diagram that illustrates a computer system in accordance with one or more embodiments.

DETAILED DESCRIPTION

Figure 1:
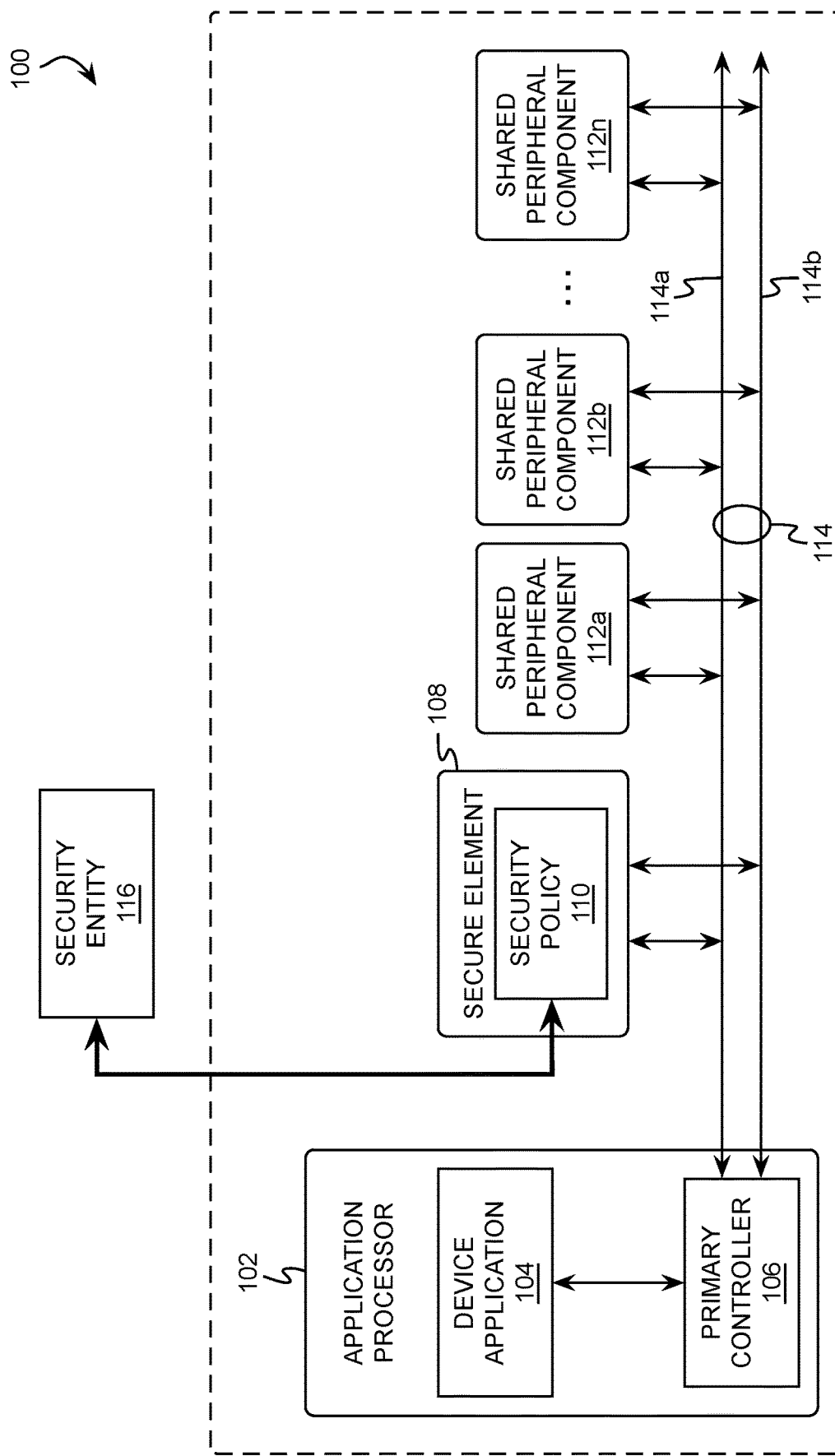
FIG. 1 illustrates a system having shared peripheral components in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
    2.1 Shared Peripheral Components
    2.2 Exclusive Peripheral Components
    2.3 Exclusive and Shared Peripheral Components
    2.4 Dual-Bus Peripheral Components
3. A SECURE ELEMENT APPLYING A SECURITY POLICY FOR PERIPHERAL COMPONENTS
    3.1 Communications with a Shared Peripheral Component
    3.2 Communications with an Exclusive Peripheral Component
    3.3 Communications with a Dual-Bus Peripheral Component
    3.4 Communications with a Mix of Peripheral Components
4. EXAMPLE EMBODIMENT
5. COMPUTER NETWORKS AND CLOUD NETWORKS
6. HARDWARE OVERVIEW
7. MISCELLANEOUS; EXTENSIONS

1. General Overview

A system may include a primary controller in communication with a peripheral component. Examples of peripheral components include, but are not limited to, a touchscreen, microphone, camera, scanner, card reader, sensors, and other internally or externally connected components. Software attacks may emanate from data received from a peripheral component and executed by a primary controller or application controller.

One or more embodiments implement a secure element (SE) hardware processor on a physical SE component located on a communication path between a peripheral component and a primary controller in a computing device. The system may implement the SE hardware processor on a bus that connects the peripheral component to the primary controller. In an embodiment, the peripheral component is configured as an I3C target for the second controller in accordance with an I3C protocol. The SE hardware processor applies a security policy to messages being transmitted between the primary controller and the peripheral component. The SE hardware processor may apply the security policy to generate validated messages that may be transmitted to a destination component.

One or more embodiments implement and enforce a security policy granting and/or denying access to device peripherals in a secure element controlling both configuration of the peripherals and access to the peripherals from an application processor across one or more bus architectures, such as an I3C bus. Implementing an access control policy in a secure element allows execution of code within the isolated secure element processor, preventing software attacks that may emanate from code running in the application processor. This design also benefits from hardware protections against physical attacks.

Contrary to some existing designs where the application processor directly reads data from peripheral devices and sensors before applying any security to the data that is received, a secure element that enforces the security between the sensors and the secure element provides greater security to the read data. Based on this configuration, data authenticity, integrity, and confidentiality is ensured end-to-end by the secure element from all device peripherals, prior to providing the read data to the local or remote application, or any external device utilizing the data via the application processor.

One or more embodiments described in this Specification and/or recited in the claims may not be included in this General Overview section.

2. System Architecture

In a computing device, such as any of the systems shown in FIGS. 1-4, various peripheral devices may be connected through various I/O interfaces (I3C, I2C, SPI, etc.) and may be controlled by software running in an application processor. The application processor, in certain cases, may be subjected to software and/or hardware attacks that attempt to bypass the computing device's OS access control policy. For example, malicious software exploiting a flaw may take control of the computing device's camera, the microphone, the GPS, etc., and may even use one of these peripheral components when it is not supposed to be accessed.

In another example, biometric data that has been read from a biometric sensor may be tampered and/or fooled, such as by reusing previous captured data (e.g., a man-in-the-middle replay attack). This type of attach is possible when the computing device does not enforce a strong end-to-end security between the sensor collecting the data and the code making use of the data, either locally or remotely. End-to-end security relies on data from the sensor and performing verifications to enforce the access control policy. A computing device that lacks end-to-end security is troublesome when the data being read is sensitive, such as water turbidity, radioactivity levels, brake status, etc.

In some examples, a device may utilize a secure element (SE), e.g., a removable SE, an embedded SE, or an integrated SE, to perform secure storage of sensitive data. One type of secure element is a root of trust (RoT). In another example, the device may use a secure element to perform cryptographic operations, e.g., digital signature, attestation, etc. When employed in these fashions, the secure element is not used to control configuration, management, and access to the peripheral components or to protect data read from those peripheral components. In these example configurations, reading data from peripheral components, even when the data is of a sensitive nature, does not guarantee the authenticity and integrity of the data. In current deployments of secure elements that are connected as targets (slaves) on I/O buses do not have direct access or control over peripheral components, preventing the secure element from implementing a complete security policy across the various peripheral components within the secure element. However, the systems shown in FIGS. 1-4 employ a secure element configured to ensure the authenticity and integrity of the data read from any of the peripheral components.

2.1 Shared Peripheral Components

FIG. 1 illustrates a system 100 in accordance with one or more embodiments. As illustrated in FIG. 1, system 100 includes an application processor 102, a secure element 108, a bus 114, and one or more shared peripheral components 112 (e.g., peripheral component 112a, peripheral component 112b, . . . , peripheral component 112n). These are referred to as "shared" because primary controller 106 and any other secondary controller on bus 114 may access the various peripheral components 112 (e.g., they are shared by all controllers on bus 114). Access to the shared peripheral components 112 is acquired through bus arbitration such that one controller at a time has an exclusive access to the shared peripheral components 112.

All peripheral devices 112 shown in FIG. 1 are shared, meaning that they may be controlled and accessed by any controller along bus 114. Secure element 108 is a microcontroller designed to be protected from unauthorized access that is configured to run a limited set of applications. In some embodiments, secure element 108 may store confidential and/or cryptographic data for use in securing transmissions and data within system 100.

In an embodiment, application processor 102 hosts a device application 104, which communicates through a primary controller 106 with the various shared peripheral components 112 along bus 114. In another approach, device application 104 may be executed on another processor within or remote to system 100. However, in this approach, device 104 still communicates to shared peripheral components 112 through primary controller 106. Bus 114 includes a control path 114a and a data path 114b, in some embodiments. These separate paths allow for data messages and control messages to be sent and received separately, for bandwidth and transmission management purposes.

In one or more embodiments, secure element 108 may be implemented as an integrated circuit (IC) device that includes two runtime environments. Any suitable IC device may be used for the secure element 108, such as system on a chip (SoC), a microcontroller unit (MCU), etc. Moreover, secure element 108 may be a component within a larger device, such as a subscriber identity module (SIM), universal integrated circuit card (UICC), etc. A first runtime environment operating on secure element 108 uses a device operating system while a second runtime environment operating on secure element 108 uses a secure execution environment (SEE). In one embodiment, bus 114 may be configured in accordance with I3C protocol standards. In an example, the SEE may operate as an I3C component capable of acting as a target or a secondary controller on the corresponding I3C bus.

Secure element 108, in one embodiment, comprises a hardware processor (not shown) that executes one or more secure element applications within the SEE. Any secure element applications may be executed on the hardware processor to enable and enhance the capabilities and functionality of secure element 108. Some example secure element applications are configured to perform cryptographic operations (e.g., authentication, encryption, decryption, hashing), protect against hacking, provide secure boot or device attestation, provide one or more digital services for end users (e.g., payment, couponing, transport, access control, ticketing, corporate, cloud computing, e-government, etc.).

Detection of hacking and modification attempts; creation of a RoT platform for encryption systems; provision of secure memory for storing private encryption keys, bank card details, and other information; cryptographically secure generation of random numbers; generation of keys, for example, pairs of private and public keys for asymmetric encryption Secure element 108 is coupled via a bus 114 to a first or primary controller 106 comprised in the same computing device (e.g., system 100) as secure element 108. Also, secure element 108 is coupled via a second bus to one or more peripheral components 112 comprised in the same computing device (e.g., system 100). As shown in system 100, the first and second bus are the same bus 114.

Secure element 108 natively restricts access to ensure protection to the functionality of the secure element 108. Secure Element 108 is a controlled environment that requires specific authorization, typically limited to an entity responsible for security administration of the system, to be able to install and configure software of the secure element 108. Also, only trusted applications and devices have read and/or write access to secure element 108, and the devices and applications which fall into these trusted categories may be controlled by another security device, such as a remote security entity 116. Secure element 108 is also designed to counter many known attacks, in particular side-channel attacks.

At a software and hardware level, secure element 108 includes some or all of the following: detection of hacking and modification attempts; creation of a RoT platform for encryption systems; provision of secure memory for storing private encryption keys, bank card details, and other information; cryptographically secure generation of random numbers; generation of keys, for example, pairs of private and public keys for asymmetric encryption.

Secure element 108 also is configured for authentication and digital signature operations. Authentication ensures that access to online services is protected not only by a username and password, but by strong authentication based on credentials that are stored and processed inside secure element 108. Authentication may be applied for logging-in to critical services, such as a virtual private network (VPN), corporate email, etc. Digital signature ensures that documents or other data may be signed, and keys for these digital signatures are stored at secure element 108, in addition to generating a signature, without sending keys to any recipients thereby providing extra security to the process.

In an embodiment, system 100 may comprise a remote security entity 116 that administrates the SEE on secure element 108. The remote security element 116 allows for updates and upgrades to assets and applications running within the SEE in a secure manner (e.g., through the use of secure channels for mutual authentication). Moreover, such operations may be performed online or offline through the use of a local agent in one approach. In another embodiment, secure element 108 is self-contained and does not rely on a remote security entity 116 for configuration.

Secure element 108 may be configured for privileged access to shared peripheral components 112 of system 100. In one embodiment, after bus arbitration secure element 108 may have exclusive control of shared peripheral components 112 when secure element 108 is acting as the secondary controller on bus 114. Otherwise, primary controller 106 has access and control of shared peripheral components 112.

Both the primary and secondary controllers may have access to shared peripheral components 112 at any given time, regardless of which controller has exclusive control over shared peripheral components 112 in an approach. Secure element 108 may be configured to execute one or several isolated applications, such as by utilizing the Oracle International Corporation Java Card platform in an embodiment.

In one embodiment, secure element 108 executes and/or applies a security policy 110 to some or all messages, data, and/or information that is received or sent by secure element 108. The security policy may dictate which messages to allow and which messages to restrict from being delivered along any particular bus (e.g., bus 114) based on the type, the identity, and/or the authenticity of peripheral components, and/or one or more identifiable characteristics of the message, such as message type, message content, message source, message destination, cryptographic and/or security feature(s) of the message (e.g., signature, encryption, etc.), message size, timing of message(s), etc.

In one or more embodiments, security policy 110 instructs secure element 108 to perform one or more actions in response to some trigger (message received, message sent, time of day, etc.). The actions may include sending at least one message to one or more components or devices, such as primary controller 106, one or more peripheral components 112, etc.

In an example, security policy 110 instructs secure element 108 to send messages to multiple different components of the device, depending on a given context (e.g., a state, measurement, parameter, etc., obtained from one or more components). In an example, the context may be global positioning system (GPS) coordinates obtained by secure element 108 itself or provided to secure element 108 by another entity internal or external to the device. In a further example, the given context may be obtained in an authenticated manner.

In various examples, the security policy may restrict the transmission of any messages that include executable code, the security policy may restrict a number of messages that may be transmitted in a given period of time, and/or the security policy may restrict messages destined for a particular component in the system.

According to an approach, secure element 108 may execute and/or apply the security policy 110 to messages received from primary controller 106, which may cause secure element 108 to issue additional messages to any other peripheral component 112 to acquire its state or data from the other peripheral component 112, before generating a corresponding message to send to an intended recipient peripheral component 112. In an opposite situation, secure element 108 may execute and/or apply the security policy 110 to response messages received from one or more of the shared peripheral components 112, prior to generating a corresponding response message to send to primary controller 106.

In one or more embodiments, secure element 108, when operating on an I3C bus, may switch from "I3C target" to "I3C secondary controller," or from "I3C secondary controller" to "I3C target." These states are exclusive and cannot be held at the same time. The switch may occur because of a request by primary controller 106, and/or on initiative of secure element 108 itself.

When secure element 108 is an "I3C target" it can receive commands from application processor 102 through primary controller 106. In an embodiment, the commands are application-level commands, e.g., updates to security policy 110, request a value from a given sensor, ask for biometric authentication, etc. In other words, they are not at the level of I3C messages, but instead are encapsulated within I3C messages.

When secure element 108 switches to an "I3C secondary controller" it performs the requested operation, e.g., biometric authentication according to security policy 110. When secure element 108 is switched back to an "I3C target," application processor 102 through primary controller 106, requests an answer to the previous operation, e.g., the result of the biometric authentication operation.

Furthermore, in one or more embodiments, messages may be a request from one of the controllers, e.g., primary controller 106 or secondary controller(s), or a response from an I3C target.

According to one or more embodiments, an administration agent may operate as a pass through on application processor 102 in between the remote security entity 116 and the SEE to ensure communication in both directions. In one embodiment, remote security entity 116 manages, within the SEE on secure element 108, the security policy 110 controlling usage, access, configuration, and/or operation of the shared peripheral components 112. In another embodiment, secure element 108 is self-contained (with regard to security policy 110) and does not rely on a remote security entity 116 to dictate the security policy 110. In this or other embodiments, secure element 108 may include an interface for updating, adjusting, modifying, and/or altering the security policy 110.

In an embodiment, the SEE on secure element 108 stores and applies the security policy 110. In particular, the SEE on secure element 108 performs one or more sensitive operations in response to the SEE on secure element 108 being executed as a secondary controller on bus 114. This provides the SEE on secure element 108 with unique and privileged access to sensitive shared peripheral components 112 on bus 114 after bus arbitration is performed with primary controller 106, in one embodiment.

In one or more embodiments, the remote security entity 116 may update the security policy 110 on a regular basis based on a programmable and updatable framework, such as Java Card. In another embodiment, the remote security entity 116 may update the security policy 110 based on some trigger (e.g., expiration of a period of time without an update having occurred), event, instruction, etc.

According to various approaches, the SEE on secure element 108 may be an I3C component that is configurable by primary controller 106 as a target or a secondary controller component on bus 114. When acting as a secondary controller on bus 114, the SEE on secure element 108 applies the security policy 110 for all peripheral components 112, thereby ensuring security and authenticity of data sent to and received from any of the peripheral components 112. This approach is particularly useful for streamlining peripheral component integration in smartphones, wearable devices, IoT devices, automotive systems, among other technologies.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a data repository (not shown) may be included in system 100. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as secure element 108. Alternatively or additionally, a data repository may be implemented or executed on a computing system separate from secure element 108. The data repository may be communicatively coupled to secure element 108 via a direct connection or via a network.

In one or more embodiments, secure element 108 refers to hardware and/or software configured to perform operations described herein for securing and managing peripheral components 112 across bus 114. Examples of operations for securing and managing peripheral components are described below with reference to FIG. 6.

In an embodiment, secure element 108 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In a first use case, assume that the shared peripheral component 112b is a biometric sensor that produces biometric data that is to be provided to the application processor 102 in conjunction with some operation therein. In the first use case, the device application 104 sends a request to the secure element 108 to obtain biometric data. The secure element 108 switches from "target" to "secondary controller" in response to the request to obtain biometric data. The secure element 108 locates and identifies the biometric sensor as being capable of providing the requested information. Thereafter, acting as the secondary controller, the secure element 108 reads the requested biometric data from the biometric sensor (shared peripheral component 112b) to enforce the security policy 110 within the device application 104. Then, the secure element 108 provides a state or verification of the biometric data (e.g., recognition successful or failed) to the application processor 102 (via the primary controller 106) for use in validating an operation within the device application 104. Primary controller 106 is able to obtain the biometric data itself from the biometric sensor, in an approach.

In a second use case, the secure element 108 protects data read from a sensor (end-to-end security). The device application 104 sends a request to the secure element 108 and the secure element 108 reads the requested data from a peripheral component (e.g., shared peripheral component 112a). Once the sensor data is obtained, the secure element 108 may perform some security operation on the sensor data before transmitting the obtained data to the device application 104. For example, the obtained data may be encrypted for confidentiality, signed for integrity and authenticity, secured with a cryptographic hash, etc.

2.2 Exclusive Peripheral Components

Figure 2:
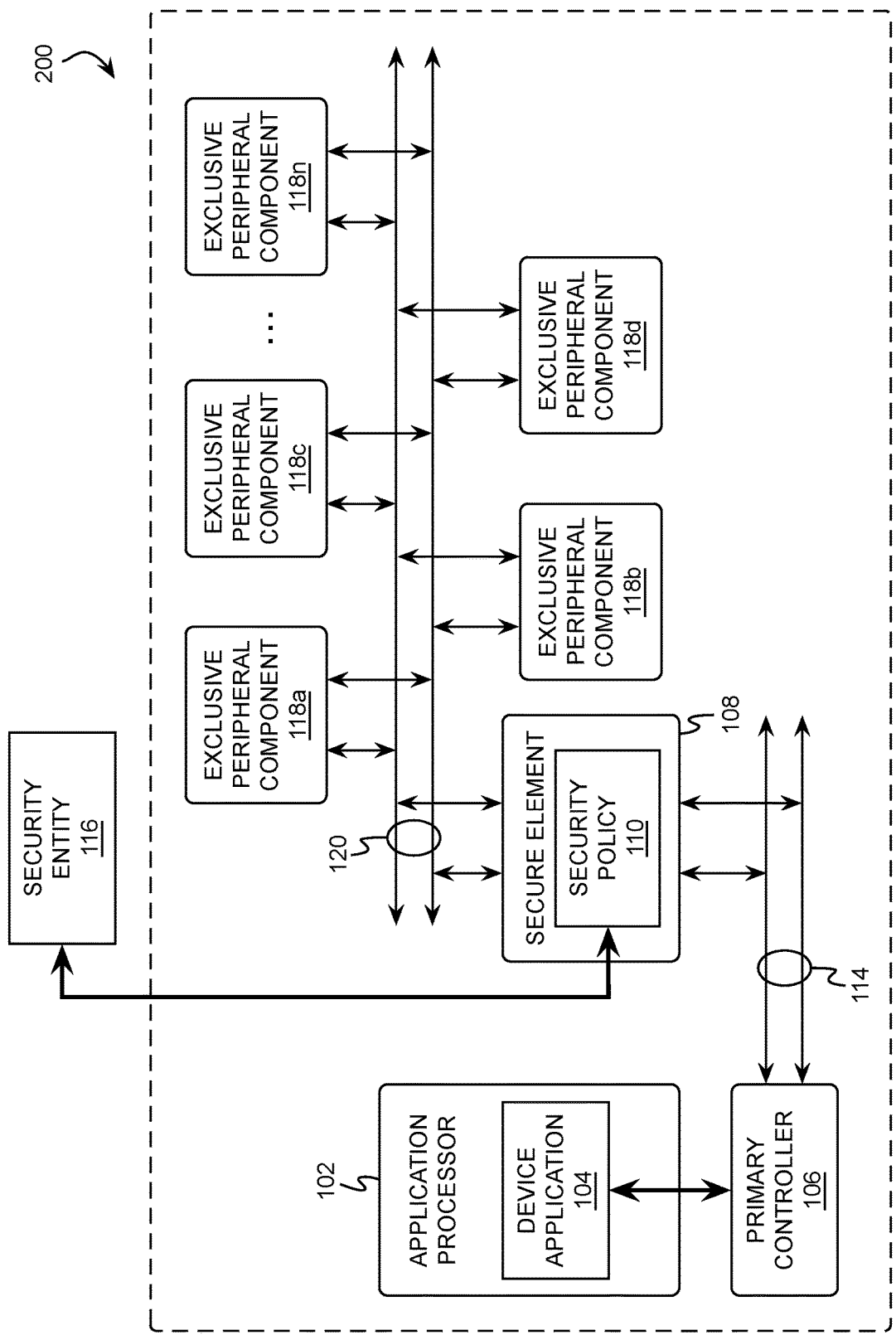
FIG. 2 illustrates a system having exclusive peripheral components in accordance with one or more embodiments.

FIG. 2 illustrates an example system 200 in accordance with one or more embodiments. As illustrated in FIG. 2, system 200 includes many elements described in FIG. 1, except that there are no shared peripheral devices 112 and instead one or more exclusive peripheral devices 118 (e.g., peripheral component 118a, peripheral component 118b, peripheral component 118c, peripheral component 118d, . . . , peripheral component 118n) are located along bus 120 coupled to secure element 108 and are only accessible through secure element 108. These are referred to as "exclusive" because only secure element 108 may access, control, and/or manage the various peripheral components 118 (e.g., they are exclusively accessed by secure element 108 acting as a secondary controller on bus 120) with no direct access by primary controller 106 being possible once bus arbitration has been performed making secure element 108 secondary controller. Secure element 108 hosts two runtime environments as described previously, including the SEE. In one embodiment, bus 120 may be configured in accordance with I3C protocol standards. In an example, the SEE may operate as an I3C component capable of acting as a target or a secondary controller on the corresponding I3C bus.

Secure element 108, in one embodiment, comprises a hardware processor (not shown) that executes a secure element application (within the SEE). Secure element 108 is coupled via a bus 114 to a first or primary controller 106 comprised in the same computing device (e.g., system 200) as secure element 108. Also, secure element 108 is coupled via a second bus to one or more peripheral components 118 comprised in the same computing device (e.g., system 200). As shown in system 200, the first bus 114 and second bus 120 are different buses.

In system 200, all communication to and from exclusive peripheral components 118 is handled by secure element 108, thereby ensuring that these communications are secure and protected. Secure element 108 is able to read all data and messages sent from all of the peripheral components 118, in addition to reading all messages and data sent to peripheral components 118. Any of this data transfer may be subjected to the security policy 110 by secure element 108, to ensure end-to-end data security, data authenticity, legitimacy of requests for peripheral component 118 access, etc. In one embodiment, even when primary controller 106 transmits a message directed to one of the exclusive peripheral components 118, secure element 108 receives this message, and generates another message based on the received message, thereby ensuring that any message sent to the exclusive peripheral components is valid and authorized according to the security policy 110.

In an example, in response to a particular message, security policy 110 may instruct secure element 108 to send messages to multiple different components of the device, e.g., to perform an authentication operation. When secure element 108 switches to an "I3C secondary controller," it performs the requested operation, e.g., biometric authentication according to security policy 110. When secure element 108 switches back to an "I3C target," application processor 102 through primary controller 106 requests an answer to the previous operation, e.g., a result of the biometric operation. In a further example, the biometric authentication may be obtained in a secured manner.

This particular operating scheme may depend on what type of message is being sent by primary controller 106. In an approach, the device host, through primary controller 106, may request that secure element 108 (as a target) perform a particular operation at an application level, e.g., perform biometric authentication. Secure element 108 switches to a secondary controller and performs the requested operation, e.g., biometric authentication according to the security policy 110. Secure element 108 switches back to a target, and the application processor 102, through primary controller 106, requests the answer to the previous operation, e.g., the result of the biometric operation.

In other words, according to various approaches, the SEE on secure element 108 may be an I3C secondary controller component on bus 120. When acting as a secondary controller on bus 120, the SEE on secure element 108 applies the security policy 110 for all peripheral components 118, thereby ensuring security and authenticity of data sent to and received from any of the peripheral components 118.

In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a data repository (not shown) may be included in system 200. The data repository may be of any type, as described previously, in various approaches.

In one or more embodiments, secure element 108 refers to hardware and/or software configured to perform operations described herein for securing and managing exclusive peripheral components 118 across bus 120. Examples of operations for securing and managing peripheral components are described below with reference to FIG. 6.

In a third use case, each of the exclusive peripheral components 118 may be access restricted devices. Therefore, in order to access any of the exclusive peripheral components 118, a device must send a request to the secure element 108, which is configured for determining whether such requests are valid, issued by trusted or authorized devices, have required formatting and identification aspects included, etc. In an example, based on the security policy 110, the secure element 108 may determine whether a request for accessing a camera is proper and either allow the access or disallow the access.

2.3 Exclusive and Shared Peripheral Components

Figure 3:
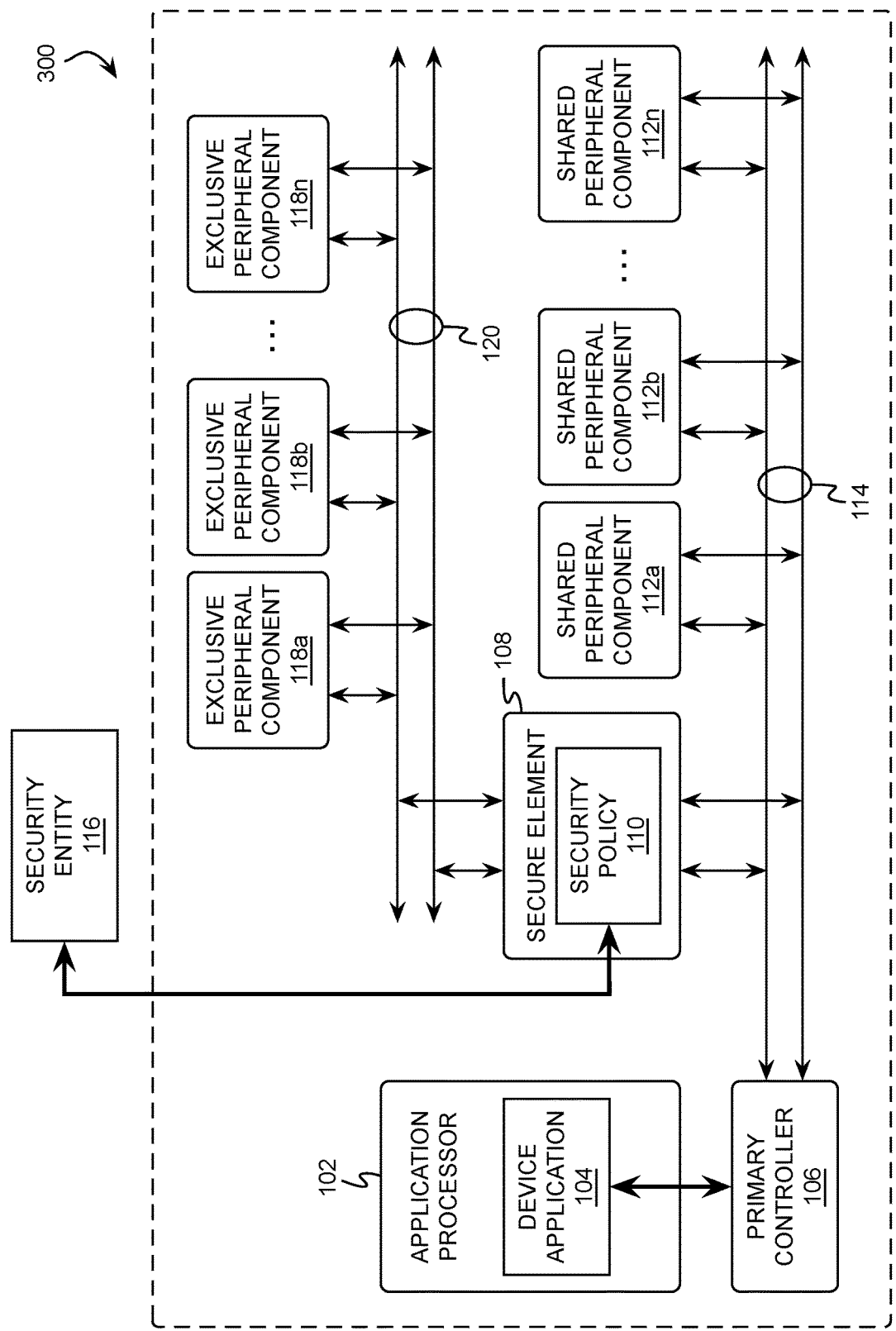
FIG. 3 illustrates a system having shared and exclusive peripheral components in accordance with one or more embodiments.

FIG. 3 illustrates an example system 300 having shared and exclusive peripheral components in accordance with one or more embodiments. As illustrated in FIG. 3, system 300 includes a secure element 108 coupled to bus 114 connected to shared peripheral components 112 and bus 120 connected to exclusive peripheral components 118, as described in FIGS. 1-2.

In system 300, all communications with exclusive peripheral components 118 must pass through secure element 108, when they are unknown to primary controller 106, and thus unreachable by primary controller 106. In other words, any request to acquire the state of or data from an exclusive peripheral component 118 passes through secure element 108. Communication with shared peripheral components 112 may be protected by secure element 108 in accordance with security policy 110, and in cases where primary controller makes use of the security provided by secure element 108 in conducting data exchange with any of peripheral components 112. Similarly, communications from any of peripheral components 112 to primary controller 106 may also be made secure by secure element 108 applying security policy 110 to the communications.

For example, when primary controller sends a first message to a peripheral component (e.g., peripheral component 112a), secure element 108 may receive this first message, apply security policy 110 to contents of the first message, generate a second message based on the first message, and send the second message to peripheral component 112a that includes validated data. The first message may continue on to peripheral component 112a in one approach (e.g., to deliver a request included in the first message which is validated by secure element 108).

In another example, when a peripheral component (e.g., peripheral component 112b) sends a first message including data (e.g., including sensor data, values, readings, a heartbeat signal, etc.) to primary controller 106, secure element 108 may receive this first message, apply security policy 110 to the first message, generate a second message based on the first message, and send the second message to primary controller 106 that includes validated data. The first message may continue on to primary controller 106 in one approach (e.g., to deliver data included in the first message which is validated by secure element 108).

In one or more embodiments, system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a data repository (not shown) may be included in system 300. The data repository may be of any type, as described previously, in various approaches.

In one or more embodiments, secure element 108 refers to hardware and/or software configured to perform operations described herein for securing and managing exclusive peripheral components 118 across bus 120 and shared peripheral components across bus 114. Examples of operations for securing and managing exclusive peripheral components are described below with reference to FIG. 6.

In a fourth use case, the secure element 108 may interact with multiple peripheral components to enforce the security policy 10. In response to the device application 104 sending a request to the secure element 108, data from multiple peripheral components may be needed to enforce the security policy 110. For example, location information may be needed from a GPS sensor (e.g., exclusive peripheral component 118a) while a transaction amount may be needed from a card reader (e.g., shared peripheral component 112b). In this example, the secure element 108 reads the location data from exclusive peripheral component 118a and the transaction amount from shared peripheral component 112b. Once this data is collected, the secure element 108 may enforce the security policy 110 on some aspect of the device application 104 which requested the data. Moreover, the request for this type of information may trigger a higher level of security in the secure element 108 (e.g., collection of biometric data to authorize the transaction), and a message will be sent to the device application 104 to make such a request of the user.

2.4 Dual-Bus Peripheral Components

Figure 4:
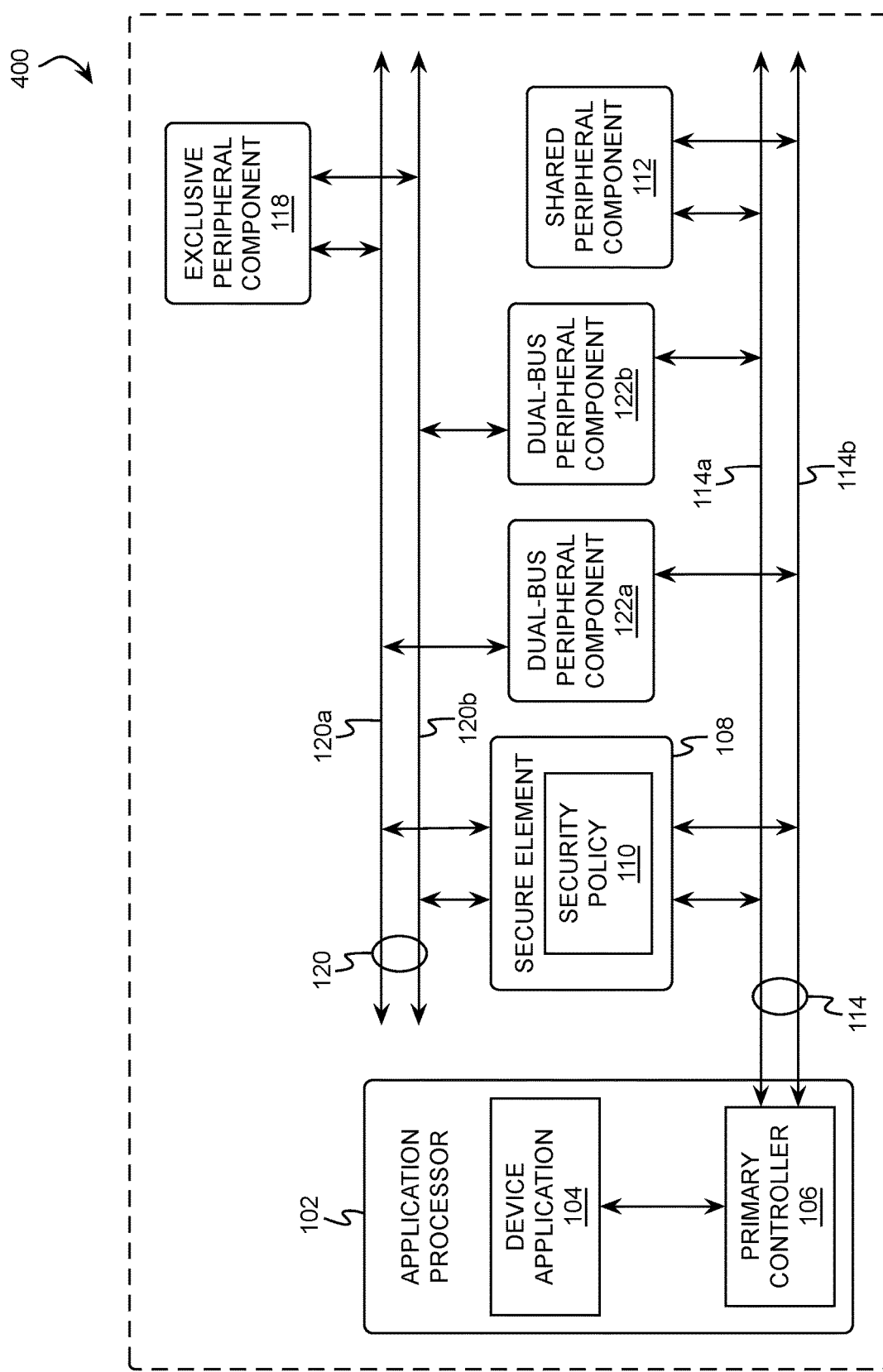
FIG. 4 illustrates a system having dual-bus peripheral components in accordance with one or more embodiments.

FIG. 4 illustrates a system 400 having dual-bus peripheral components in accordance with one or more embodiments. As illustrated in FIG. 4, system 400 includes a secure element 108 coupled to bus 114 connected to at least one shared peripheral component 112, and bus 120 connected to at least one exclusive peripheral component 118, as described in FIGS. 1-2. In one or more embodiments, secure element 108 hosts two runtime environments as described previously, including the SEE. In one embodiment, buses 114 and/or 120 may be configured in accordance with I3C protocol standards. In an example, the SEE may operate as an I3C component capable of acting as a target or a secondary controller on the corresponding I3C bus.

In addition, system 400 includes one or more dual-bus peripheral components 122 (e.g., dual-bus peripheral component 122a, dual-bus peripheral component 122b, etc.). These are referred to as "dual-bus" because each of these peripheral devices are connected to multiple buses, e.g., bus 114, bus 120.

In an example, dual-bus peripheral component 122a is coupled to control path 120a of bus 120 and to data path 114b of bus 114. The control path 120a is exclusively used by secure element 108 to apply a security policy 110 and configure the peripheral component 122a. The configuration may include requesting peripheral component 122a to disregard any messages received from primary controller 106 and/or sending appropriate responses based on the configuration.

Because primary controller 106 is not directly connected to control path 120a, it cannot modify the configuration of peripheral component 122a and must send messages to secure element 108 to apply the security policy 110. Secure element 108 will generate control messages to configure the peripheral component 122a appropriately based on message(s) sent from primary controller 106, allowing primary controller 106 to configure the peripheral component 122a to behave in an expected manner (e.g., when sending further messages on data path 114b).

In other words, in example system 400, all data communications sent to/received from dual-bus peripheral component 122a occur along data path 114b, which is shared by primary controller 106 and secure element 108. All control messages sent to/received from dual-bus peripheral component 122a occur along control path 120a, which is exclusive to secure element 108. Therefore, if primary controller 106 wants to send a control message to dual-bus peripheral component 122a, it must send the message to secure element 108, which can then provide the control message to dual-bus peripheral component 122a.

In an example, dual-bus peripheral component 122b is coupled to control path 114a of bus 114 and to data path 120b of bus 120. The control path 114a is used by secure element 108 to apply a security policy 110 and shared by secure element 108 and primary controller 106 to configure the dual-bus peripheral component 122b. The configuration may include requesting dual-bus peripheral component 122b to disregard any messages received from primary controller 106 and/or sending appropriate responses based on the configuration.

Because primary controller 106 is directly connected to control path 114a, it can modify the configuration of peripheral component 122b and can send messages directly to dual-bus peripheral component 122b. Secure element 108 may generate control messages to configure the dual-bus peripheral component 122b appropriately based on message(s) sent from primary controller 106, in one embodiment, in order to apply security policy 110 to control messages sent by primary controller 106.

In other words, in example system 400, all data communications sent to/received from dual-bus peripheral component 122b occur along data path 120b, which is exclusive to secure element 108. All control messages sent to/received from dual-bus peripheral component 122b occur along control path 114a, which is shared by primary controller 106 and secure element 108. Therefore, if primary controller 106 wants to obtain and/or send data to dual-bus peripheral component 122b, it must send a message to secure element 108, which can then provide the data message to dual-bus peripheral component 122b and, in some instances, provide validated data back to primary controller 106.

One or more dual-bus peripheral components 122 may be included in a system to enable exclusive access/control to the data output from the dual-bus peripheral component and/or control messages provided to the dual-bus peripheral component 122, to better secure which device(s) the peripheral component communicates with, and the content and veracity of messages that are generated by the peripheral component.

Communications with shared peripheral components 112 may be protected by secure element 108 in accordance with security policy 110, including communications with primary controller 106 when it recognizes that secure element 108 is providing security to communications along bus 114 and/or bus 120. Similarly, communications from any of peripheral components 112 to primary controller 106 may also be made secure by secure element 108 applying security policy 110 to the communications.

Shared peripheral component(s) 112 and exclusive peripheral component(s) 118 operate as described in FIGS. 1-2 when operating in system 400, even when a system includes dual-bus peripheral component(s) 122 that operate on two or more buses in the system, in accordance with one or more embodiments.

In various embodiments, system 400 may: a) not include any shared peripheral components 112, and/or b) not include any exclusive peripheral components 118. These peripheral components are included in FIG. 400 to illustrate that many different types of peripheral components may exist and function together in a single system but are not necessarily required to be included in the system in any particular arrangement.

In one or more embodiments, the system 400 may include more or fewer components than the components illustrated in FIG. 4. The components illustrated in FIG. 4 may be local to or remote from each other. The components illustrated in FIG. 4 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a data repository (not shown) may be included in system 400. The data repository may be of any type, as described previously, in various approaches.

In various embodiments, secure element 108 refers to hardware and/or software configured to perform operations described herein for securing and managing dual-bus peripheral components 122, exclusive peripheral components 118, and/or shared peripheral components 112 on any of buses 114 and 120. Examples of operations for securing and managing peripheral components are described below with reference to FIG. 6.

In a fifth use case, assume that dual-bus peripheral component 122b is a camera. In order to access the camera, a request must first be validated by secure element 108 for control messages to be sent along control path 120b of bus 120. However, once the camera is active and producing image data, primary controller 106 has access to the output image data along data path 114a of bus 114. Therefore, access to the camera is more strongly protected than is the image data captured by the camera, which may be manipulated, stolen, or blocked more easily by a malevolent actor accessing the output without authorization. However, it will be more difficult for this malevolent actor to gain control of the camera due to the presence and functioning of the secure element 108 on the control path side of the camera.

This split bus design is useful to secure access to sensitive components, while still ensuring a high data throughput for data produced from the components.

Figure 5A:
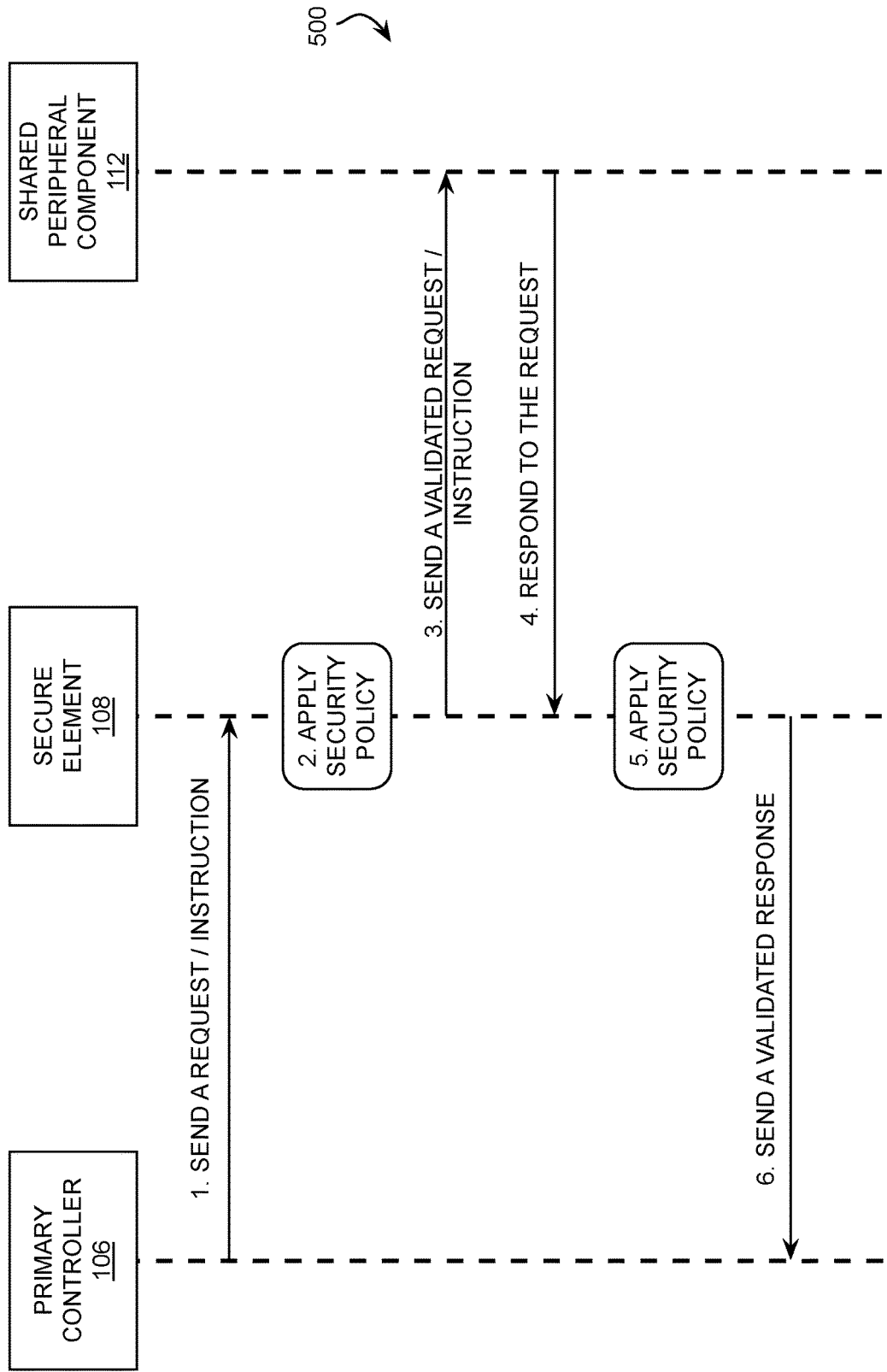

3. A Secure Element Applying a Security Policy for Peripheral Components 3.1 Communications with a Shared Peripheral Component FIG. 5A illustrates a sequence diagram for communicating with a shared peripheral component in accordance with one or more embodiments. In this example sequence diagram, secure element 108 is configured to apply the security policy 110 to messages received from the primary controller 106 and from any shared peripheral component 112. In one example, the sequence 500 comprises: 1) primary controller 106 (based on a request from the device application or some other remote/external device or application, in an approach) initiates a request to a shared peripheral component 112, 2) secure element 108 applies the security policy 110 to the request/instruction, 3) secure element 108 generates and sends at least one validated request/instruction to one or more shared peripheral components 112, 4) the one or more shared peripheral components 112 generate(s) a response to the at least one validated request/instruction and send(s) the response(s) to secure element 108, 5) secure element 108 applies the security policy 110 to the response(s), and 6) secure element 108 sends at least one validated response to primary controller 106 (to be provided to the device application or some other remote/external device or application, in an approach).

In a further embodiment, secure element 108, in response to the request, may repeat steps 3 and 4 for multiple different peripheral components 112. For example, 3) secure element 108 generates and sends multiple validated requests/instructions to multiple shared peripheral components 112, and 4) the multiple shared peripheral components 112 generate individual responses to its own received validated request/instruction and send the individual responses to secure element 108.

In this example, secure element 108 secures communications from primary controller 106 to shared peripheral component 112 and communications from shared peripheral component 112 to primary controller 106, thereby ensuring end-to-end security of all data exchange across the bus (and to the device application or some other remote/external device or application, in an approach). Should secure element 108 detect an issue when applying the security policy 110 to any of the messages, the security policy 110 may dictate one or more actions to take, such as dropping the message and not sending it to a designated recipient, isolating a sending device from future communications, sending a warning or alert message to primary controller 106, etc.

Figure 5B:
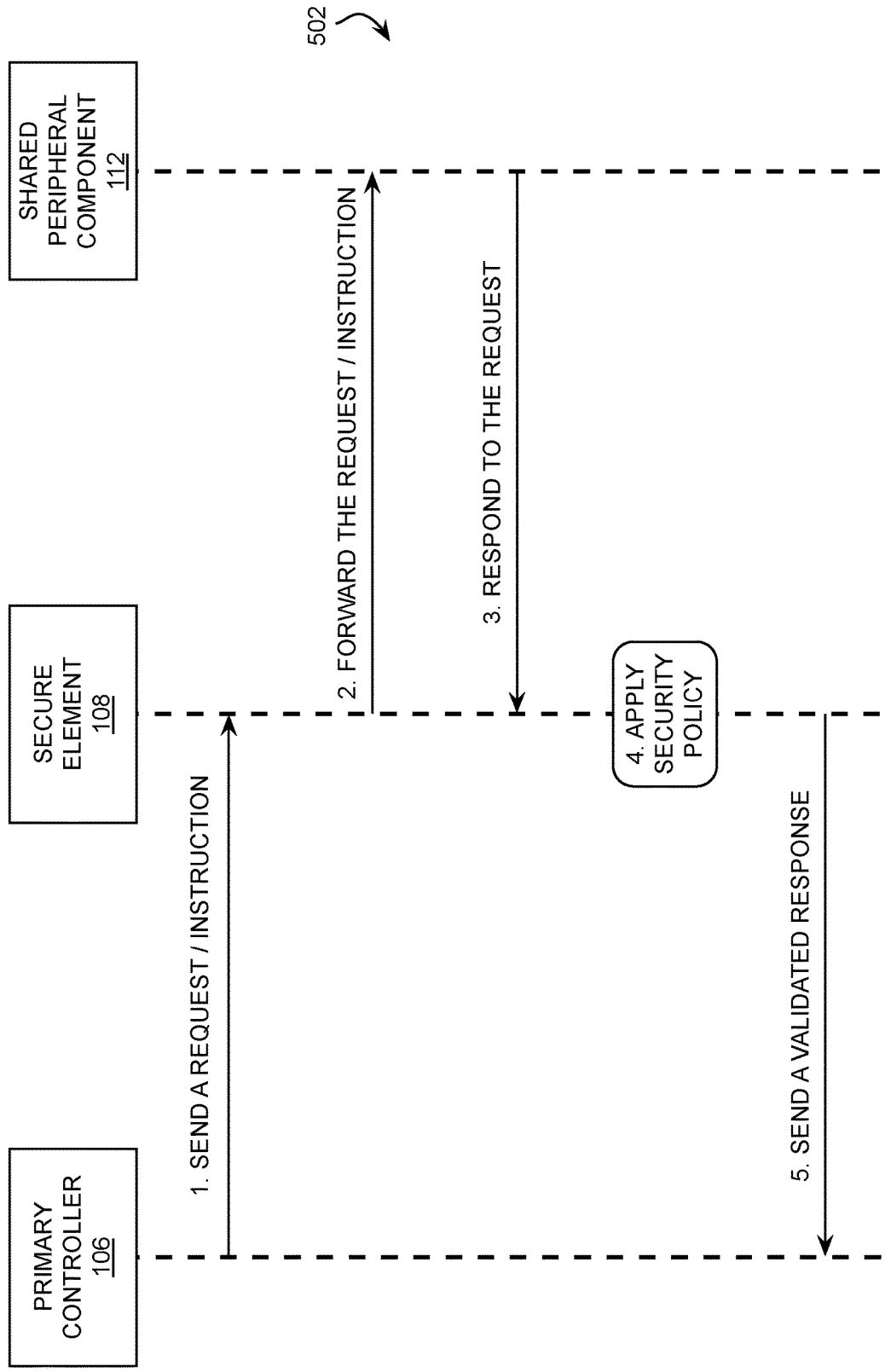

FIG. 5B illustrates a sequence diagram for communicating with a shared peripheral component in accordance with one or more embodiments. In this example sequence diagram, secure element 108 is configured to apply the security policy 110 only to messages received from any shared peripheral component 112, or the security policy 110 does not include any security steps for messages received from primary controller 106. In one example, the sequence 502 comprises: 1) primary controller 106 (based on a request from the device application or some other remote/external device or application, in an approach) initiates a request to a shared peripheral component 112, 2) secure element 108 sends and/or forwards the request/instruction to shared peripheral component 112, 3) shared peripheral component 112 generates a response to the request/instruction and sends the response to secure element 108, 4) secure element 108 applies the security policy 110 to the response, and 5) secure element 108 sends a validated response to primary controller 106 (to be provided to the device application or some other remote/external device or application, in an approach).

In this example, secure element 108 secures communications from shared peripheral component 112 to primary controller 106 but not from primary controller 106 to shared peripheral component 112, thereby ensuring that data provided by shared peripheral component 112 is valid and authentic before it is sent to primary controller 106 (and to the device application or some other remote/external device or application, in an approach). Should secure element 108 detect an issue when applying the security policy 110 to the response, the security policy 110 may dictate one or more actions to take, such as dropping the response message and not sending it on to primary controller 106, isolating shared peripheral component 112 from future communications, sending a warning or alert message to primary controller 106, etc.

Figure 5C:
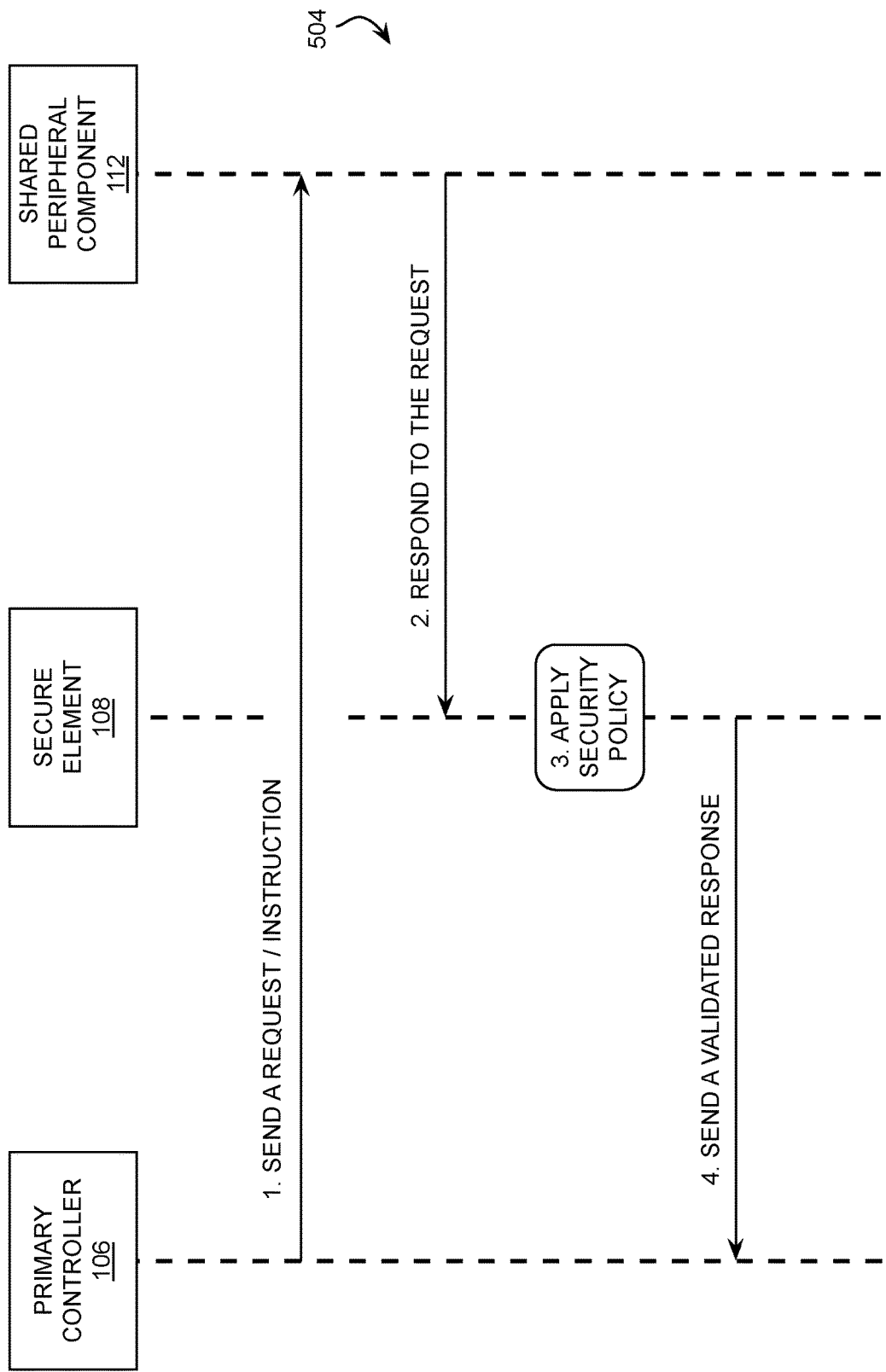

FIG. 5C illustrates a sequence diagram for communicating with a shared peripheral component in accordance with one or more embodiments. In this example sequence diagram, secure element 108 is configured to apply the security policy 110 only to messages received from any shared peripheral component 112, or the security policy 110 does not include any security steps for messages received from primary controller 106. In one example, the sequence 504 comprises: 1) primary controller 106 (based on a request from the device application or some other remote/external device or application, in an approach) initiates a request to a shared peripheral component 112 which bypasses secure element 108 along the shared bus, 2) shared peripheral component 112 generates a response to the request/instruction and sends the response to secure element 108, 3) secure element 108 applies the security policy 110 to the response, and 4) secure element 108 sends a validated response to primary controller 106 (to be provided to the device application or some other remote/external device or application, in an approach).

In this example, secure element 108 secures communications from shared peripheral component 112 to primary controller 106 but not from primary controller 106 to shared peripheral component 112, similar to FIG. 5B. The difference is that primary controller 106 communicates directly with shared peripheral component 112 without using secure element 108 as an intermediary. Should secure element 108 detect an issue when applying the security policy 110 to the response, the security policy 110 may dictate one or more actions to take, as described herein.

3.2 Communications with an Exclusive Peripheral Component

Figure 5D:
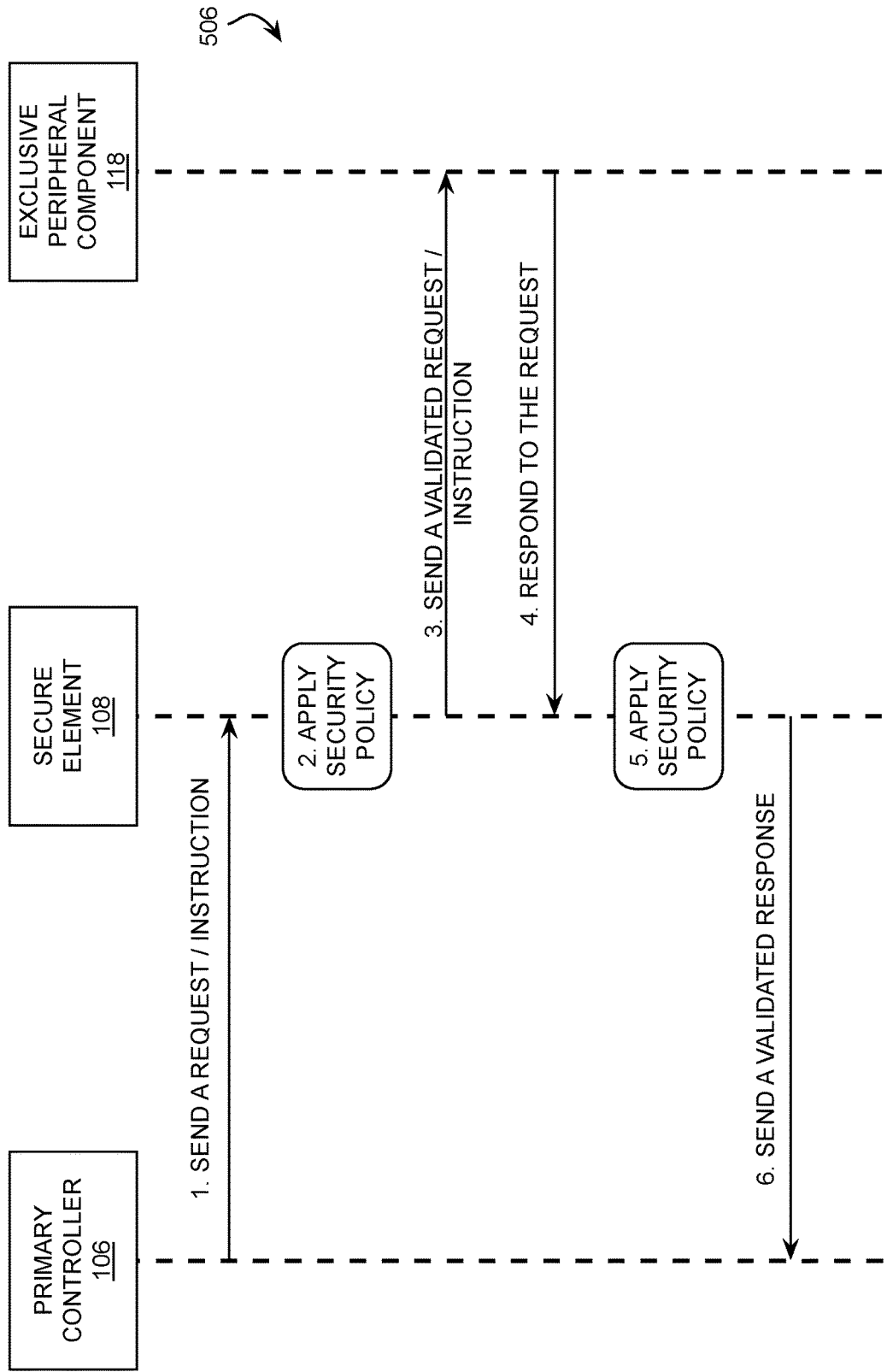

FIG. 5D illustrates a sequence diagram for communicating with an exclusive peripheral component in accordance with one or more embodiments. In this example sequence diagram, secure element 108 is configured to apply the security policy 110 to messages sent to and received from any exclusive peripheral component 118. In one example, the sequence 506 comprises: 1) primary controller 106 (based on a request from the device application or some other remote/external device or application, in an approach) initiates a request to an exclusive peripheral component 118, 2) secure element 108 applies the security policy 110 to the request/instruction and generates at least one validated request/instruction, 3) secure element 108 sends the at least one validated request/instruction to one or more exclusive peripheral components 118, 4) exclusive peripheral component(s) 118 generate(s) at least one response to the validated request/instruction(s) and send(s) the at least one response to secure element 108, 5) secure element 108 applies the security policy 110 to the response(s), and 6) secure element 108 sends at least one validated response to primary controller 106 (to be provided to the device application or some other remote/external device or application, in an approach).

In this example, secure element 108 secures communications from primary controller 106 to exclusive peripheral component 118 (since it is the only controller on the exclusive bus) and communications from exclusive peripheral component 118 to primary controller 106, thereby ensuring end-to-end security of all data exchange across the bus. Should secure element 108 detect an issue when applying the security policy 110 to any of the messages, the security policy 110 may dictate one or more actions to take, as described herein.

FIG. 5E illustrates a sequence diagram for communicating with an exclusive peripheral component in accordance with one or more embodiments. In this example sequence diagram, secure element 108 is configured to apply the security policy 110 only to messages received from an exclusive peripheral component 118. In one example, the sequence 508 comprises: 1) primary controller 106 (based on a request from the device application or some other remote/external device or application, in an approach) initiates a request to an exclusive peripheral component 118, 2) secure element 108 forwards and/or sends the request/instruction to exclusive peripheral component 118, 3) exclusive peripheral component 118 generates a response to the request/instruction and sends the response to secure element 108, 4) secure element 108 applies the security policy 110 to the response, and 5) secure element 108 sends a validated response to primary controller 106 (to be provided to the device application or some other remote/external device or application, in an approach).

In this example, secure element 108 secures communications from exclusive peripheral component 118 to primary controller 106, but not from primary controller 106 to exclusive peripheral component 118, thereby ensuring that data provided by exclusive peripheral component 118 is valid and authentic before it is sent to primary controller 106. Should secure element 108 detect an issue when applying the security policy 110 to any of the messages, the security policy 110 may dictate one or more actions to take, as described herein.

Figure 5F:
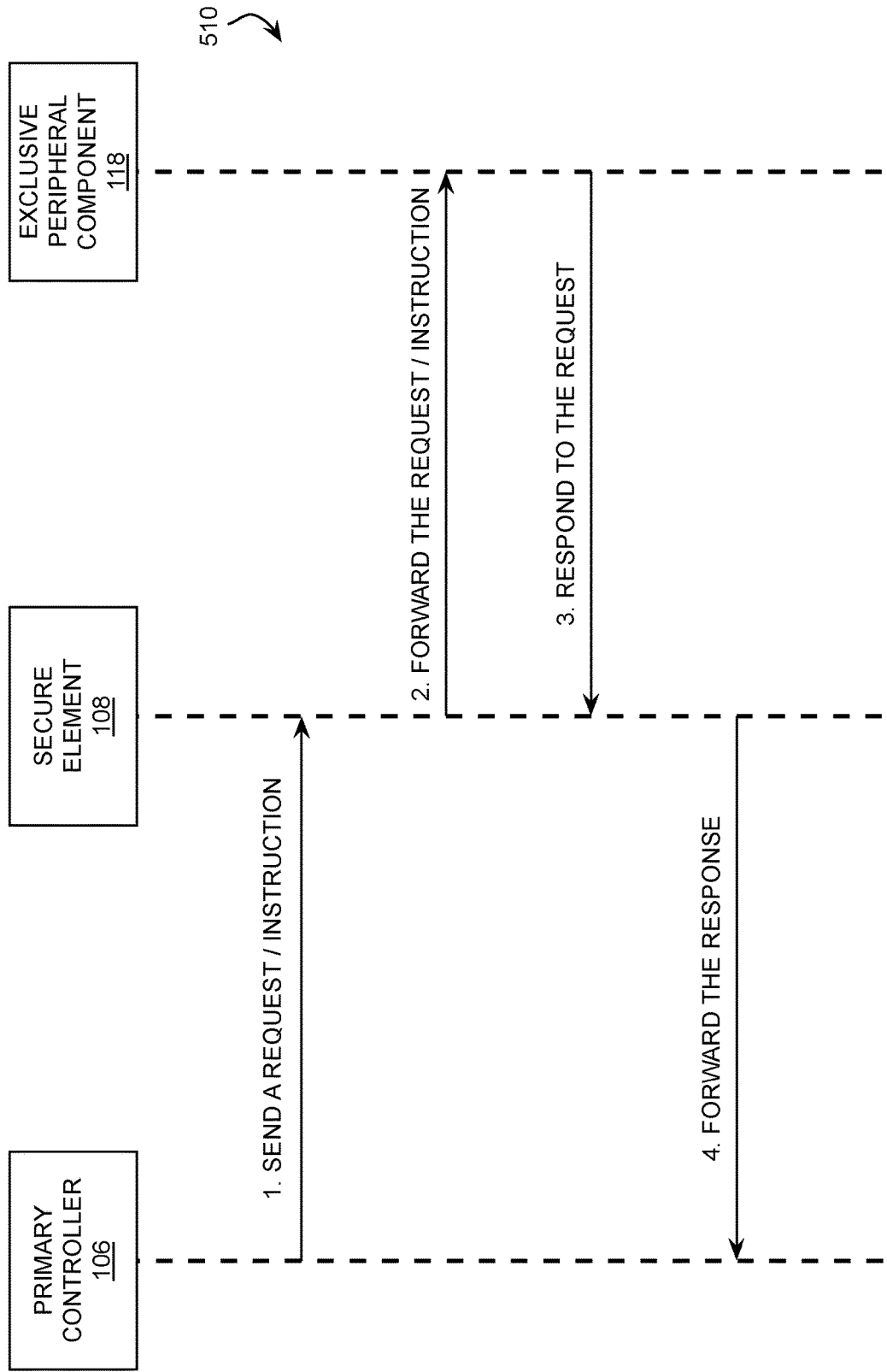

FIG. 5F illustrates a sequence diagram for communicating with an exclusive peripheral component in accordance with one or more embodiments. In this example sequence diagram, secure element 108 is not configured to apply the security policy 110 to messages sent to and received from an exclusive peripheral component 118. Instead, it acts as an intermediary device to provide the primary controller 106 with access to the exclusive peripheral components 118. In one example, the sequence 510 comprises: 1) primary controller 106 (based on a request from the device application or some other remote/external device or application, in an approach) initiates a request to an exclusive peripheral component 118, 2) secure element 108 forwards and/or sends the request/instruction to exclusive peripheral component 118, 3) exclusive peripheral component 118 generates a response to the request/instruction and sends the response to secure element 108, 4) secure element 108 forwards and/or sends a response to primary controller 106 (to be provided to the device application or some other remote/external device or application, in an approach).

In this example, secure element 108 does not secure any of the communications and acts merely to provide access to the exclusive peripheral components 118 on the exclusive bus.

3.3 Communications with a Dual-Bus Peripheral Component

Figure 5G:
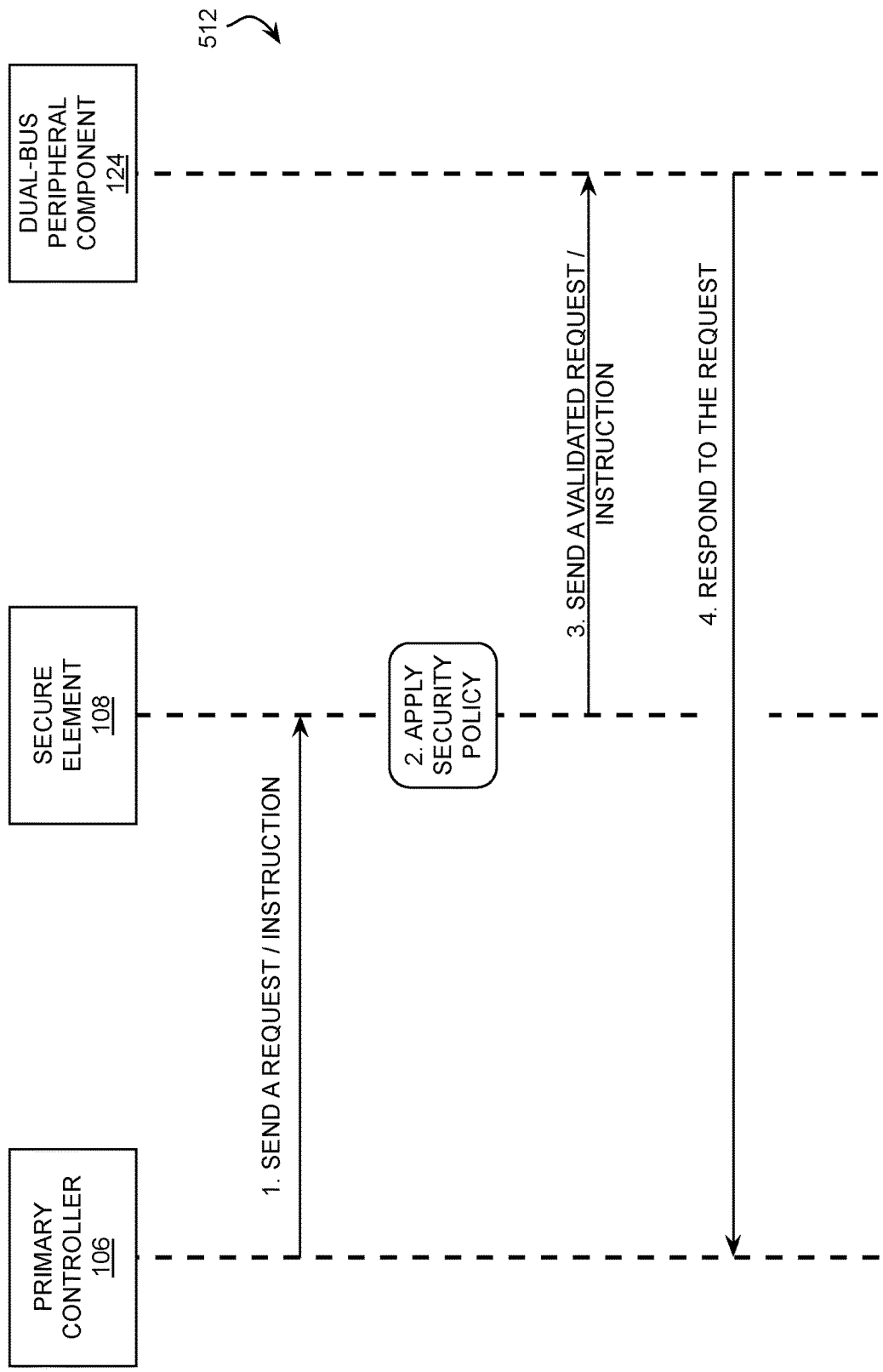

FIG. 5G illustrates a sequence diagram for communicating with a dual-bus peripheral component in accordance with one or more embodiments. In this example sequence diagram, secure element 108 is configured to apply the security policy 110 to messages received from the primary controller 106, such as instructions and/or control messages for accessing and/or controlling a dual-bus peripheral component 124. This dual-bus peripheral component 124 may be coupled to a shared bus that is controlled by primary controller 106, and/or connected to an exclusive bus controlled by secure element 108. In one example, the sequence 512 comprises: 1) primary controller 106 (based on a request from the device application or some other remote/external device or application, in an approach) initiates a request to a dual-bus peripheral component 124, 2) secure element 108 applies the security policy 110 to the request/instruction, 3) secure element 108 generates and sends a validated request/instruction to dual-bus peripheral component 124, 4) shared peripheral component 112 generates a response to the validated request/instruction and sends the response directly to primary controller 106 (to be provided to the device application or some other remote/external device or application, in an approach), bypassing secure element 108 and any application of the security policy 110.

In this example, secure element 108 secures communications from primary controller 106 to dual-bus peripheral component 124 but not to communications from dual-bus peripheral component 124 to primary controller 106. Should secure element 108 detect an issue when applying the security policy 110 to any of the messages, the security policy 110 may dictate one or more actions to take, as described herein.

Figure 5H:
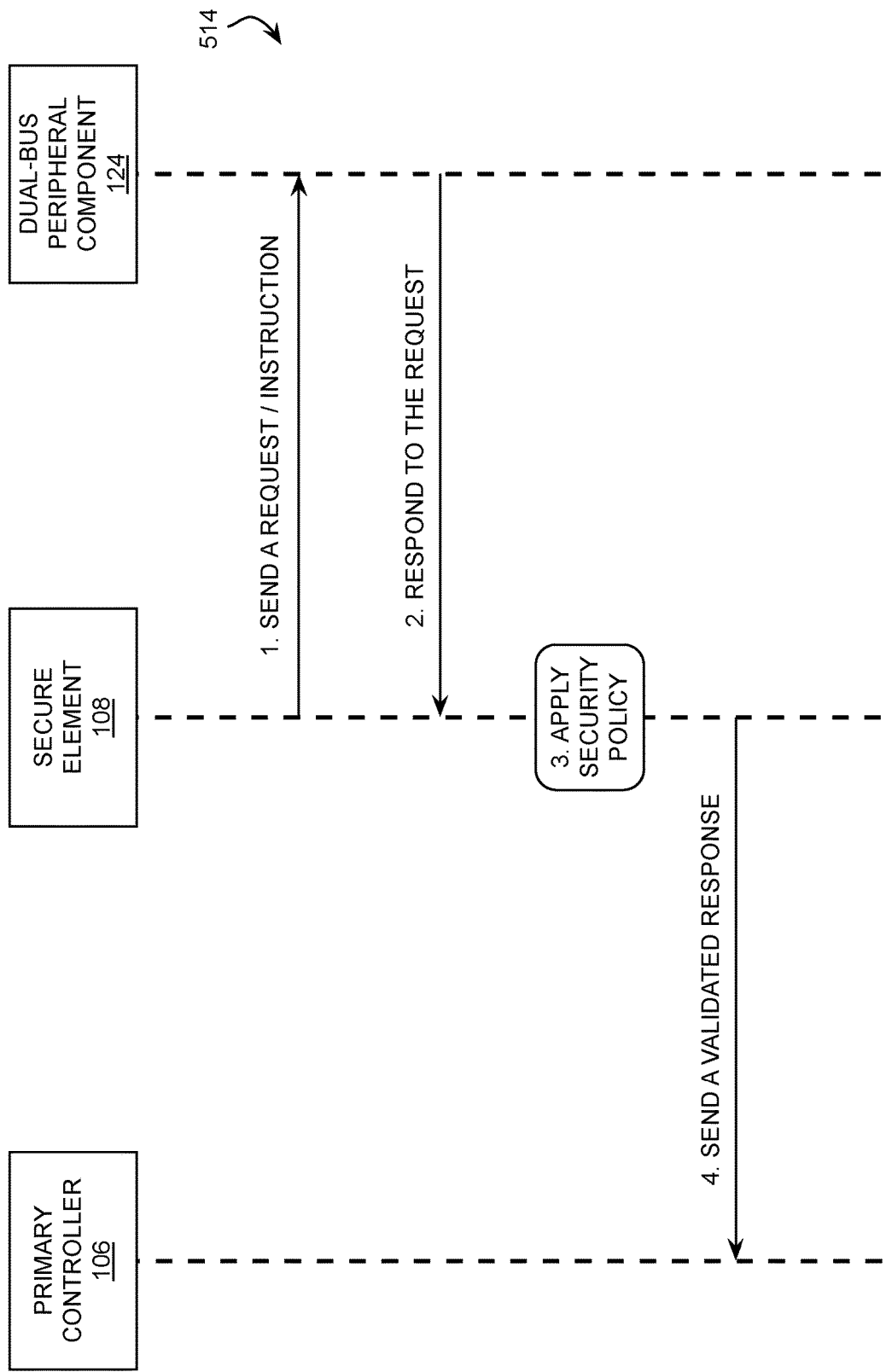

FIG. 5H illustrates a sequence diagram for communicating with a dual-bus peripheral component in accordance with one or more embodiments. In this example sequence diagram, secure element 108 is configured to apply the security policy 110 to messages received from any dual-bus peripheral component 124, such as data and/or messages describing a condition, state, or sensor reading from dual-bus peripheral component 124. This dual-bus peripheral component 124 may be coupled to a shared bus that is controlled by primary controller 106 in an example, and/or connected to an exclusive bus controlled by secure element 108.

In one example, the sequence 514 comprises: 1) secure element 108 initiates a request to a dual-bus peripheral component 124, 2) shared peripheral component 112 generates a response to the request/instruction and sends the response to secure element 108, 3) secure element 108 applies the security policy 110 to the response and generates a validated response, and 4) secure element 108 sends the validated response to primary controller 106 (to be provided to the device application or some other remote/external device or application, in an approach). The last operation may not be performed in cases where primary controller 106 is not expecting the response, in which case secure element 108 may act on the response on its own.

In this example, secure element 108 secures communications from dual-bus peripheral component 124 to primary controller 106. Should secure element 108 detect an issue when applying the security policy 110 to any of the messages, the security policy 110 may dictate one or more actions to take, as described herein.

3.4 Communications with a Mix of Peripheral Components

Figure 5I:
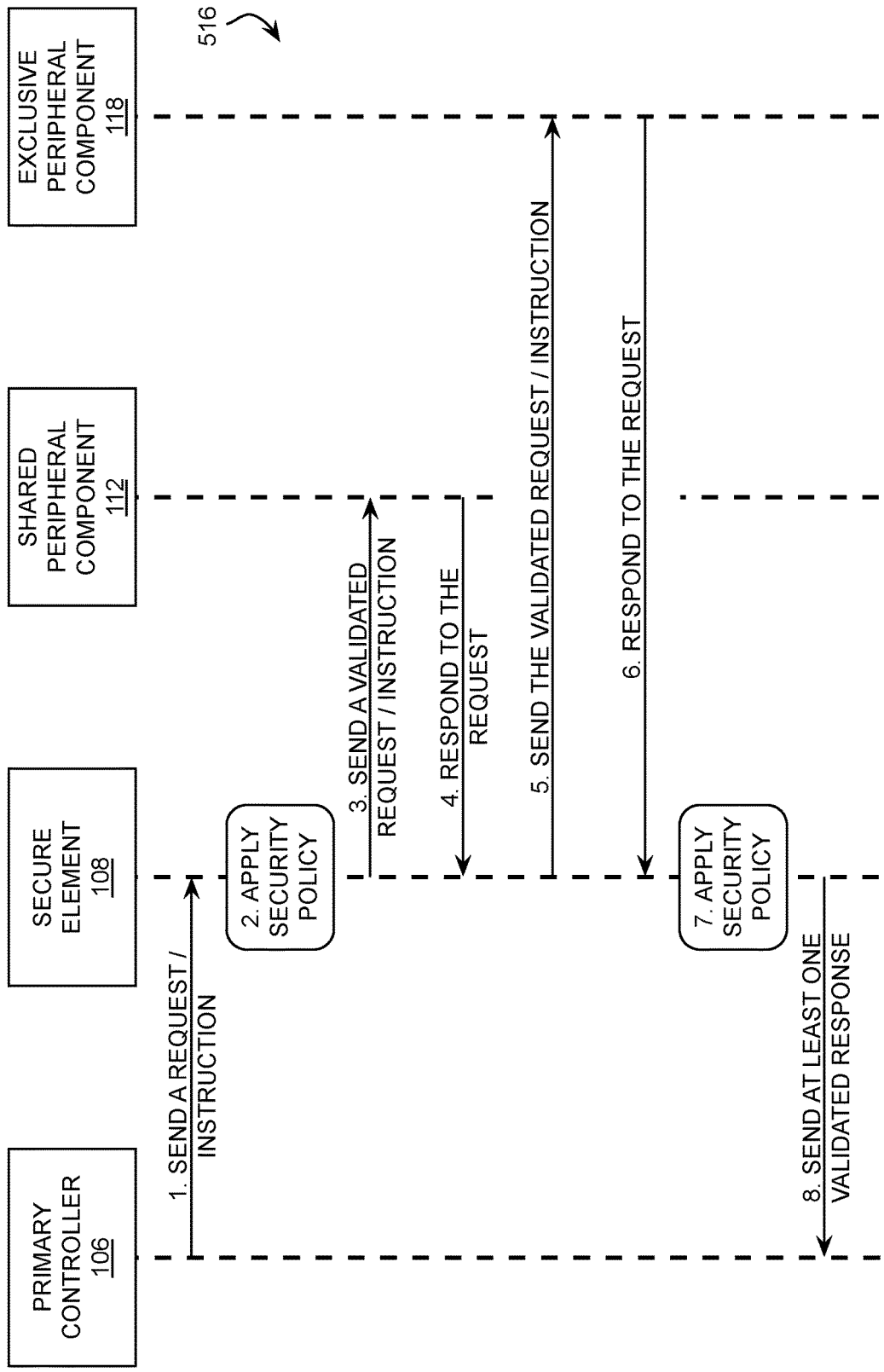

FIG. 5I illustrates a sequence diagram for communicating with a combination of shared and exclusive peripheral components in accordance with one or more embodiments. In this example sequence diagram, secure element 108 is configured to apply the security policy 110 to messages sent to and/or received from any of the peripheral components (e.g., exclusive peripheral component 118, shared peripheral component 112, etc.). In one example, the sequence 516 comprises: 1) primary controller 106 (based on a request from the device application or some other remote/external device or application, in an approach) initiates a request to multiple peripheral components, 2) secure element 108 applies the security policy 110 to the request/instruction, including determining which peripheral device should be accessed for fulfilling the request/instruction, 3) secure element 108 sends at least one validated request/instruction to one or more shared peripheral components 112 (in an approach, this validated request/instruction may be partially fulfilled by shared peripheral component 112 and/or the validated request/instruction may be based on a portion of the original request/instruction from primary controller 106), 4) one or more shared peripheral components 112 send(s) at least one response to the request to secure element 108, 5) before, after, or in parallel with operation 3, secure element 108 sends at least one second validated request/instruction to one or more exclusive peripheral components 118 (this second validated request/instruction may be the same as the first validated request/instruction, or may be based on a second portion of the original request/instruction), 6) one or more exclusive peripheral components 118 generate(s) at least one response to the validated request/instruction and send(s) the at least one response to secure element 108, 8) secure element 108 applies the security policy 110 to the various responses, and 8) secure element 108 sends at least one validated response to primary controller 106 (to be provided to the device application or some other remote/external device or application, in an approach).

More than two different peripheral devices may be accessed by secure element 108 in various embodiments, based on what type of data is being requested, where instructions are designated for delivery, types and capabilities of peripheral components on the buses connected to secure element 108, etc.

In this example, secure element 108 secures communications in all directions along the various buses, thereby ensuring end-to-end data integrity and authenticity. Should secure element 108 detect an issue when applying the security policy 110 to any of the messages, the security policy 110 may dictate one or more actions to take, as described herein.

Figure 5J:
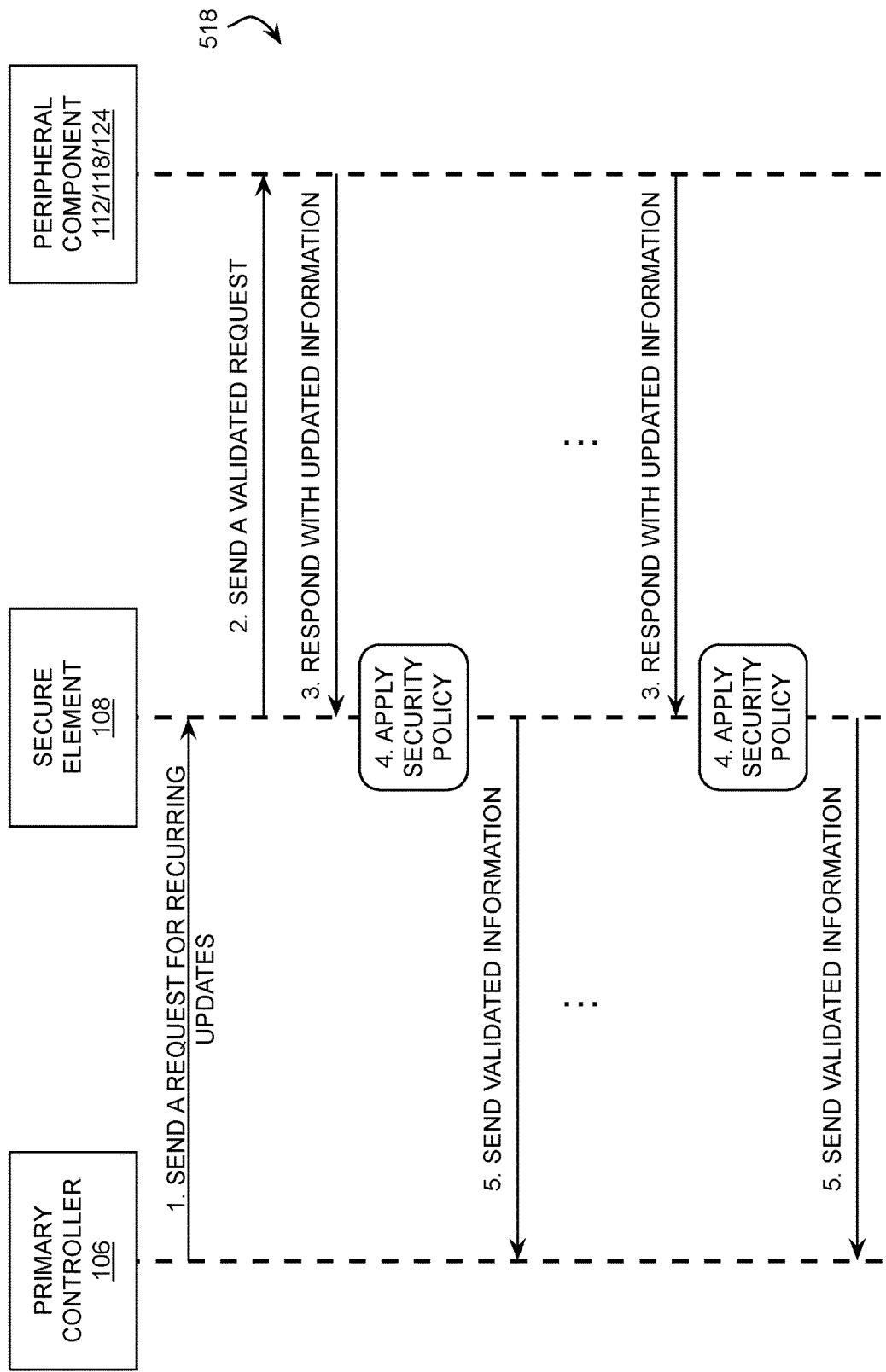

FIG. 5J illustrates a sequence diagram for communicating with a combination of peripheral components in accordance with one or more embodiments. In this example sequence diagram, secure element 108 is configured to apply the security policy 110 to messages sent to and/or received from any of the peripheral components 112/118/124. In one example, the sequence 518 comprises: 1) primary controller 106 (based on a request from the device application or some other remote/external device or application, in an approach) initiates a request for recurring updates to be provided by one or more peripheral components, 2) secure element 108 may apply the security policy 110 to the request or send a second message to the one or more peripheral components 112/118/124 as dictated by the original request, 3) peripheral component(s) 112/118/124 sends a response to the request with updated information to secure element 108, 4) secure element 108 applies the security policy 110 to the update response(s), and 5) secure element 108 sends validated information to primary controller 106 (to be provided to the device application or some other remote/external device or application, in an approach). On a recurring basis, which may be in accordance with a schedule, trigger(s), or randomly, operations 3, 4, and 5 are repeated to keep information provided to primary controller 106 (and the device application or some other remote/external device or application, in an approach) up-to-date.

In this example, secure element 108 may secure communications in all directions along the various buses, thereby ensuring end-to-end data integrity and authenticity (when the security policy 110 is applied to messages from primary controller 106). Should secure element 108 detect an issue when applying the security policy 110 to any of the messages, the security policy 110 may dictate one or more actions to take, as described herein.

In any of the sequences of operations described in FIGS. 5A-5J, an initial request may be initiated by primary controller 106 or by secure element 108. Moreover, portions of any of the sequences of operations described in FIGS. 5A-5J may be added to, subtracted from, replaced by, and/or modified by operations in other Figures, in accordance with one or more embodiments.

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6:
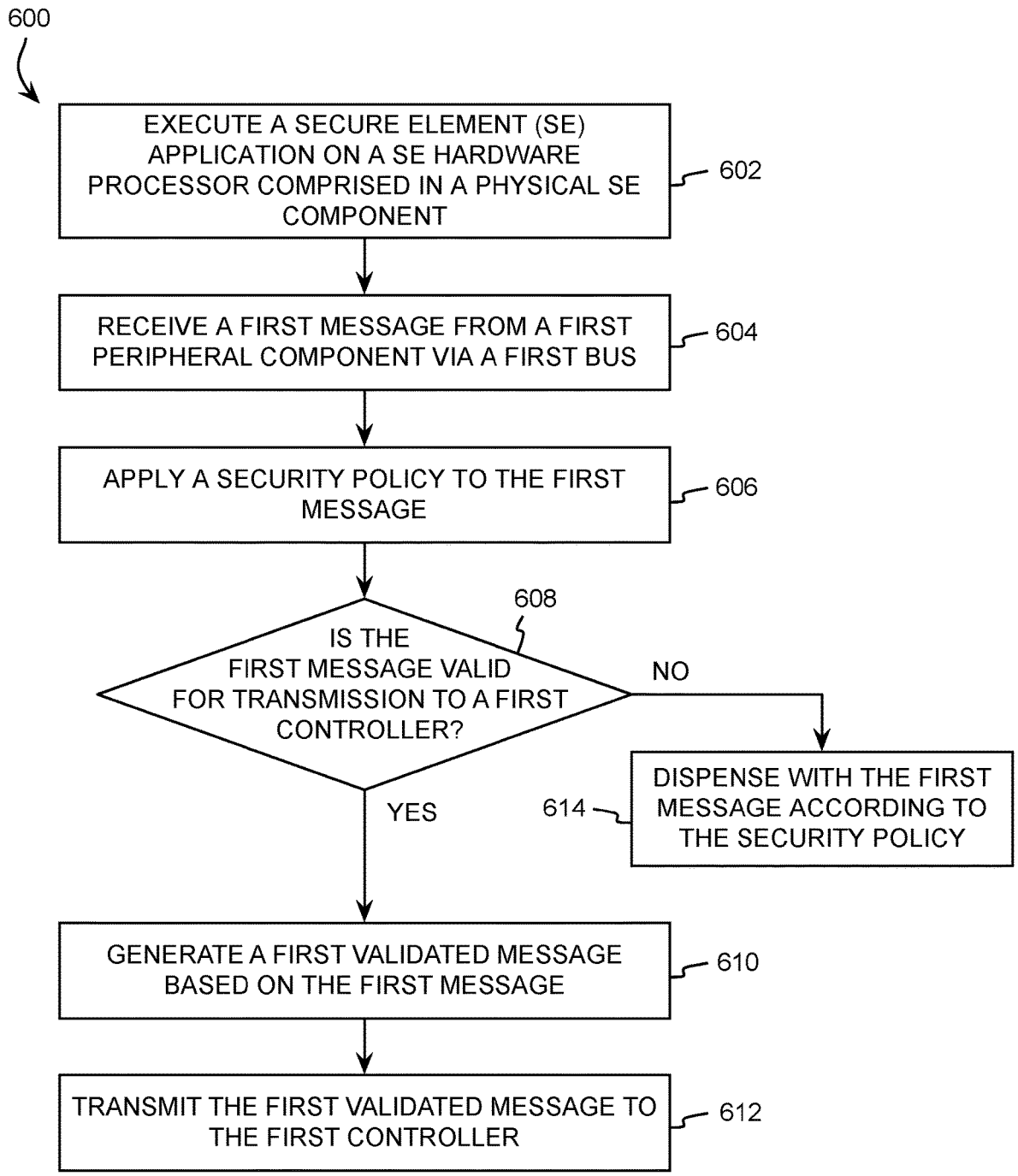
FIG. 6 illustrates an example set of operations for providing security to peripheral components using a secure element in accordance with one or more embodiments.

FIG. 6 illustrates an example set of operations 600 for providing security to peripheral components using a secure element in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments. In the context of FIG. 6, the set of operations 600 will be described as being performed by a system. Although the operations 600 are described as being executed by a system, any hardware, software, or combination thereof may be used to execute the set of operations 600 in one or more embodiments.

The system executes a secure element (SE) application and/or SEE on a SE hardware processor that is comprised in a physical SE component (e.g., a secure element) in Operation 602. In this operation, (a) the physical SE component is coupled via a first bus to a first controller comprised in a same computing device as the physical SE component, and (b) the physical SE component is coupled via a second bus to a first peripheral component comprised in the same computing device. In one embodiment, the first bus and the second bus are the same bus. In an alternate embodiment, the first and second buses are different buses, and may have different primary controllers thereon.

In an embodiment, the physical SE component is an integrated circuit (IC) protected from unauthorized access, and the physical SE component is configured to execute a limited set of applications which includes the SE application.

The system receives, by a second controller implemented by the SE hardware processor, a first message from the first peripheral component via the first bus in Operation 604. In an embodiment, the first message may be prompted by an earlier message sent by a device (e.g., the second controller, the first controller, etc.) to the first peripheral component, according to a predefined schedule, in response to a triggering condition, etc.

The system applies, by the SE hardware processor, a security policy to the first message to generate a first validated message in Operation 606. The security policy may include instructions that describe actions to be taken by a secure element based on analysis of a message, e.g., for authenticity, validity, identity of originating device, satisfying a cryptographic challenge, etc. For example, a security policy may include, without restriction, any of the following: instructions for examination of one or more different types of messages, instructions for how to treat one or more message types, instructions for which devices have access to one or more particular peripheral components, instructions for dispensing with messages that are not validated (delete, block, flag or mark, return to sender, isolate for later follow-up, etc.), a list of trusted devices, a list of untrusted devices, authorized users, etc.

The system determines, after application of the security policy, whether the first message is valid for transmission to the first controller in Operation 608. Any type of validation operations may be used and/or included in the security policy, as described herein in various approaches.

In response to determining that the first message is valid, the system generates a first validated message in Operation 610. The SE hardware processor generates the first validated message based on the first message in an embodiment. The first validated message may include some or all of the first message. In another approach, the first validated message may be a signal, indicator, or other simple pointer that denotes that a valid and/or authentic message was received from the first peripheral component.

According to one approach, information included in the first validated message may be identical to information included in the first message.

The system transmits the first validated message to the first controller in Operation 612. In an approach, the bus on which the first message was received from the first peripheral component is used to transmit the first validated message to the first controller. In an alternate approach, a different bus may be used to transmit the first validated message to the first controller.

In response to determining that the first message is not valid, the system dispenses with the first message in accordance with the security policy or a default action in Operation 614.

In an embodiment, access and control of the first peripheral component may be shared by the first controller and the second controller. In another embodiment, the first peripheral component may be controlled by the second controller, and access to the first peripheral component may be limited by the SE hardware processor.

In a further embodiment, the second controller transmits a second message to the first peripheral component via the first bus. The first message is received subsequent to transmitting the second message, and in one approach, the first message being sent may be triggered by receiving the second message.

In an embodiment, the second controller may receive a third message from the first controller prior to transmitting the second message, and the SE hardware processor applies the security policy to the third message and generates the second message based on the third message subsequent to applying the security policy to the third message.

In one or embodiments, the second message may be generated by encrypting at least a portion of the third message, with the second message including the encrypted portion of the third message. In another approach, the entirety of the third message may be encrypted to generate the second message.

According to one or more approaches, the second controller may receive a second message from the first controller prior to receiving the first message. The SE hardware processor may apply the security policy to the second message, and then subsequent to applying the security policy to the second message, the following operations may be performed: a) the SE hardware processor generates a third message based on the second message; b) the second controller transmits the third message to a second peripheral component via a third bus, with control of the second peripheral component being shared by the first controller and the second controller; c) the SE hardware processor generates a fourth message based on the second message; and d) the second controller transmits the fourth message to the first peripheral component via the first bus, with the first message being received subsequent to transmitting the fourth message, and the first peripheral component being exclusively controlled by the second controller.

Figure 7:
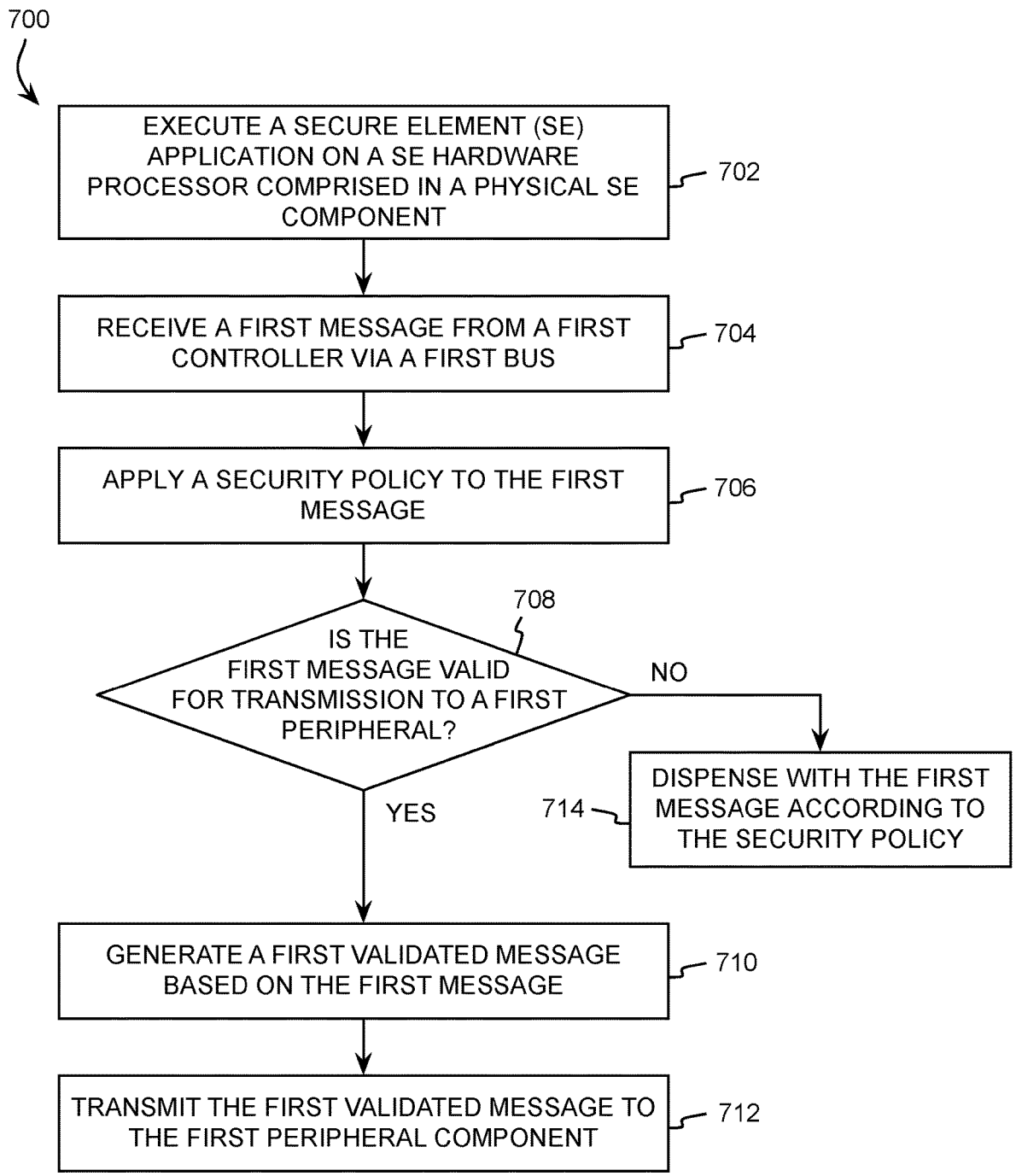
FIG. 7 illustrates an example set of operations for providing security to peripheral components using a secure element in accordance with one or more embodiments.

FIG. 7 illustrates an example set of operations 700 for providing security to peripheral components using a secure element in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments. In the context of FIG. 7, the set of operations 700 will be described as being performed by a system. Although the operations 700 are described as being executed by a system, any hardware, software, or combination thereof may be used to execute the set of operations 700 in one or more embodiments.

The system executes a secure element (SE) application on a SE hardware processor comprised in a physical SE component in Operation 702. The physical SE component is coupled via a first bus to a first controller comprised in a same computing device as the physical SE component, and the physical SE component is coupled via a second bus to a first peripheral component comprised in the same computing device. The first bus and the second bus may be the same bus or different buses, and may have the same primary controller or different primary controllers, in various approaches.

According to an approach, the physical SE component may be an IC protected from unauthorized access, and configured to execute a limited set of applications, including the SE application.

The system receives, by a second controller implemented by the SE hardware processor, a first message from the first controller via the first bus in Operation 704.

The system applies, by the SE hardware processor, a security policy to the first message in Operation 706.

The system determines, after application of the security policy, whether the first message is valid for transmission to a first peripheral component in Operation 708. Any type of validation operations may be used and/or included in the security policy, as described herein in various approaches.

In response to determining that the first message is valid, the system generates a first validated message in Operation 710. The SE hardware processor generates the first validated message based on the first message in an embodiment. The first validated message may include some or all of the first message. In another approach, the first validated message may be a signal, indicator, or other simple pointer that denotes that a valid and/or authentic message was received from the first controller and authorized for transmission to the first peripheral component.

In one approach, the first validated message may be generated by encrypting at least a portion of the first message, with the first validated message including the encrypted portion of the first message, possibly along with other security feature(s), information, and/or data.

The system transmits, by the second controller, the first validated message to the first peripheral component via the second bus in Operation 712.

In response to determining that the first message is not valid, the system dispenses with the first message in accordance with the security policy (or a default action) in Operation 714.

In one embodiment, the first peripheral component may be controlled by the second controller, and access to components along the second bus, including the first peripheral component, may be limited by the SE hardware processor.

In a further embodiment, the second controller receives a second message from the first peripheral component via the second bus, the SE hardware processor applies the security policy to the second message to generate a second validated message, and the second controller transmits the second validated message to the first controller via the first bus.

According to one embodiment, the first peripheral component may be controlled by the second controller, access to components along the second bus including the first peripheral component are limited by the SE hardware processor, the physical SE component is an IC protected from unauthorized access, the physical SE component is configured to execute a limited set of applications including the SE application, generating the first validated message includes encrypting at least a portion of the first message, the first validated message includes the encrypted portion of the first message, and the second controller receives a second message from the first peripheral component via the second bus, the SE hardware processor applies the security policy to the second message to generate a second validated message, and the second controller transmits the second validated message to the first controller via the first bus.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    executing a secure element (SE) application on a SE hardware processor comprised in a physical SE component, wherein: (a) the physical SE component is coupled via a first bus to a first controller comprised in a same computing device as the physical SE component, and (b) the physical SE component is coupled via a second bus to a first peripheral component comprised in the same computing device,
    wherein the SE hardware processor executes one or more secure element applications within a secure execution environment, wherein the SE application is configured to perform authentication through one or more secure channels with at least one device that is remote from the SE hardware processor;
    receiving, by a second controller implemented by the SE hardware processor, a first message from the first peripheral component via the first bus;
    applying, by the SE hardware processor, a security policy to the first message to generate a first validated message; and
    transmitting, by the second controller, the first validated message to the first controller.

2. The method as recited in claim 1, wherein the first bus and the second bus are a same bus.

3. The method as recited in claim 1, further comprising, transmitting, by the second controller, a second message to the first peripheral component via the first bus, wherein the first message is received subsequent to transmitting the second message.

4. The method as recited in claim 3, further comprising:
receiving, by the second controller, a third message from the first controller prior to transmitting the second message;
applying, by the SE hardware processor, the security policy to the third message; and
subsequent to applying the security policy to the third message, generating the second message based on the third message.

5. The method as recited in claim 3, wherein generating the second message comprises encrypting at least a portion of the third message, and wherein the second message comprises the encrypted portion of the third message.

6. The method as recited in claim 1, further comprising:
receiving, by the second controller, a second message from the first controller prior to receiving the first message;
applying, by the SE hardware processor, the security policy to the second message;
subsequent to applying the security policy to the second message:
generating, by the SE hardware processor, a third message based on the second message;
transmitting, by the second controller, the third message to a second peripheral component via a third bus, wherein control of the second peripheral component is shared by the first controller and the second controller;
generating, by the SE hardware processor, a fourth message based on the second message; and
transmitting, by the second controller, the fourth message to the first peripheral component via the first bus, wherein the first message is received subsequent to transmitting the fourth message, and wherein the first peripheral component is exclusively controlled by the second controller.

7. The method as recited in claim 6, further comprising:
generating, by the SE hardware processor, one or more additional messages based on the second message;
transmitting, by the second controller, the one or more additional messages to at least one additional peripheral components via the third bus;
receiving, by the second controller, at least one additional response message from the at least one additional peripheral components via the third bus; and
applying, by the SE hardware processor, the security policy to the at least one additional response message.

8. The method as recited in claim 1, wherein access and control of the first peripheral component is shared by the first controller and the second controller.

9. The method as recited in claim 1, wherein the first peripheral component is controlled by the second controller, and wherein access to the first peripheral component is limited by the SE hardware processor.

10. The method as recited in claim 1, wherein the physical SE component is an integrated circuit protected from unauthorized access, wherein the physical SE component is configured to execute a limited set of applications including the SE application, and wherein the SE application provides authentication and encryption services for messages received at the physical SE component.

11. The method as recited in claim 1, wherein information included in the first validated message is identical to information included in the first message.

12. The method as recited in claim 1, wherein the SE hardware processor generates the first validated message based on the first message.

13. The method as recited in claim 1, wherein the physical SE component is configured as an I3C target and comprises the second controller in accordance with I3C protocol.

14. The method as recited in claim 1, wherein the first peripheral component is configured as an I3C target for the second controller in accordance with I3C protocol.

15. The method as recited in claim 1, wherein the second bus is configured in accordance with I3C protocol.

16. A method, comprising:
executing a secure element (SE) application on a SE hardware processor comprised in a physical SE component, wherein: (a) the physical SE component is coupled via a first bus to a first controller comprised in a same computing device as the physical SE component, and (b) the physical SE component is coupled via a second bus to a first peripheral component comprised in the same computing device,
wherein the SE hardware processor executes one or more secure element applications within a secure execution environment, wherein the SE application is configured to perform authentication through one or more secure channels with at least one device that is remote from the SE hardware processor;
receiving, by a second controller implemented by the SE hardware processor, a first message from the first controller via the first bus;
applying, by the SE hardware processor, a security policy to the first message to generate a first validated message; and
transmitting, by the second controller, the first validated message to the first peripheral component via the second bus.

17. The method as recited in claim 16, wherein the first bus and the second bus are a same bus.

18. The method as recited in claim 16, wherein the first peripheral component is controlled by the second controller, and wherein access to components along the second bus including the first peripheral component is limited by the SE hardware processor.

19. The method as recited in claim 16, wherein the physical SE component is an integrated circuit protected from unauthorized access, wherein the physical SE component is configured to execute a limited set of applications including the SE application, and wherein the SE application provides authentication and encryption services for messages received at the physical SE component.

20. The method as recited in claim 16, wherein generating the first validated message comprises encrypting at least a portion of the first message, and wherein the first validated message comprises the encrypted portion of the first message.

21. The method as recited in claim 16, further comprising:
receiving, by the second controller, a second message from the first peripheral component via the second bus;
applying, by the SE hardware processor, the security policy to the second message to generate a second validated message; and
transmitting, by the second controller, the second validated message to the first controller via the first bus.

22. The method as recited in claim 16, wherein information included in the first validated message is identical to information included in the first message.

23. The method as recited in claim 16, wherein the SE hardware processor generates the first validated message based on the first message.

24. The method as recited in claim 16, wherein the physical SE component is configured as an I3C target and comprises the second controller in accordance with I3C protocol.

25. The method as recited in claim 16, wherein the first peripheral component is configured as an I3C target for the second controller in accordance with I3C protocol.

26. The method as recited in claim 16, wherein the second bus is configured in accordance with I3C protocol.

27. The method as recited in claim 16, wherein the first peripheral component is controlled by the second controller, wherein access to components along the second bus including the first peripheral component is limited by the SE hardware processor, wherein the physical SE component is an integrated circuit protected from unauthorized access, wherein the physical SE component is configured to execute a limited set of applications including the SE application, wherein generating the first validated message comprises encrypting at least a portion of the first message, wherein the first validated message comprises the encrypted portion of the first message, wherein the physical SE component is configured as an I3C target and comprises the second controller in accordance with I3C protocol, wherein the first peripheral component is configured as an I3C target for the second controller in accordance with I3C protocol, wherein the second bus is configured in accordance with I3C protocol, and wherein the method further comprises:

receiving, by the second controller, a second message from the first peripheral component via the second bus;

applying, by the SE hardware processor, the security policy to the second message to generate a second validated message; and transmitting, by the second controller, the second validated message to the first controller via the first bus.

28. One or more non-transitory computer-readable media comprising instructions that, when executed by one or more hardware processors, cause performance of operations comprising:

executing a secure element (SE) application on a SE hardware processor comprised in a physical SE component, wherein: (a) the physical SE component is coupled via a first bus to a first controller comprised in a same computing device as the physical SE component, and (b) the physical SE component is coupled via a second bus to a first peripheral component comprised in the same computing device, wherein the SE hardware processor executes one or more secure element applications within a secure execution environment, wherein the SE application is configured to perform authentication through one or more secure channels with at least one device that is remote from the SE hardware processor;

receiving, by a second controller implemented by the SE hardware processor, a first message from the first peripheral component via the first bus;

applying, by the SE hardware processor, a security policy to the first message to generate a first validated message; and transmitting, by the second controller, the first validated message to the first controller.

29. One or more non-transitory computer-readable media comprising instructions that, when executed by one or more hardware processors, cause performance of operations comprising:

executing a secure element (SE) application on a SE hardware processor comprised in a physical SE component, wherein: (a) the physical SE component is coupled via a first bus to a first controller comprised in a same computing device as the physical SE component, and (b) the physical SE component is coupled via a second bus to a first peripheral component comprised in the same computing device, wherein the SE hardware processor executes one or more secure element applications within a secure execution environment, wherein the SE application is configured to perform authentication through one or more secure channels with at least one device that is remote from the SE hardware processor;

receiving, by a second controller implemented by the SE hardware processor, a first message from the first controller via the first bus;

applying, by the SE hardware processor, a security policy to the first message to generate a first validated message; and transmitting, by the second controller, the first validated message to the first peripheral component via the second bus.

30. A system comprising:

at least one device including a hardware processor;

the system being configured to perform operations comprising:

executing a secure element (SE) application on a SE hardware processor comprised in a physical SE component, wherein: (a) the physical SE component is coupled via a first bus to a first controller comprised in a same computing device as the physical SE component, and (b) the physical SE component is coupled via a second bus to a first peripheral component comprised in the same computing device, wherein the SE hardware processor executes one or more secure element applications within a secure execution environment, wherein the SE application is configured to perform authentication through one or more secure channels with at least one device that is remote from the SE hardware processor;

receiving, by a second controller implemented by the SE hardware processor, a first message from the first peripheral component via the first bus;

applying, by the SE hardware processor, a security policy to the first message to generate a first validated message; and transmitting, by the second controller, the first validated message to the first controller.

31. A system comprising:

at least one device including a hardware processor the system being configured to perform operations comprising:

executing a secure element (SE) application on a SE hardware processor comprised in a physical SE component, wherein: (a) the physical SE component is coupled via a first bus to a first controller comprised in a same computing device as the physical SE component, and (b) the physical SE component is coupled via a second bus to a first peripheral component comprised in the same computing device, wherein the SE hardware processor executes one or more secure element applications within a secure execution environment, wherein the SE application is configured to perform authentication through one or more secure channels with at least one device that is remote from the SE hardware processor;

receiving, by a second controller implemented by the SE hardware processor, a first message from the first controller via the first bus;

applying, by the SE hardware processor, a security policy to the first message to generate a first validated message; and transmitting, by the second controller, the first validated message to the first peripheral component via the second bus.

\* \* \* \* \*